United States Patent
Sakurai et al.

(10) Patent No.: US 10,477,176 B2
(45) Date of Patent: Nov. 12, 2019

(54) RECEPTION DEVICE, BROADCAST SYSTEM, RECEPTION METHOD, AND PROGRAM

(71) Applicant: Sharp Kabushiki Kaisha, Sakai, Osaka (JP)

(72) Inventors: Ryoji Sakurai, Sakai (JP); Shigeki Taniguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/754,367

(22) PCT Filed: Aug. 17, 2016

(86) PCT No.: PCT/JP2016/074020
§ 371 (c)(1),
(2) Date: Feb. 22, 2018

(87) PCT Pub. No.: WO2017/033811
PCT Pub. Date: Mar. 2, 2017

(65) Prior Publication Data
US 2018/0249140 A1    Aug. 30, 2018

(30) Foreign Application Priority Data
Aug. 24, 2015   (JP) .................. 2015-164794

(51) Int. Cl.
*H04N 9/77*   (2006.01)
*H04N 21/41*  (2011.01)
(Continued)

(52) U.S. Cl.
CPC ............... *H04N 9/77* (2013.01); *H04N 9/646* (2013.01); *H04N 11/20* (2013.01); *H04N 21/41* (2013.01);
(Continued)

(58) Field of Classification Search
CPC ....................... H04N 21/4345; H04N 21/2362
See application file for complete search history.

(56) References Cited

U.S. PATENT DOCUMENTS 7,817,184 B1 * 10/2010 Michener ............... H04N 17/04
                                                         348/189
7,982,634 B2 *  7/2011 Arrighetti ............ G06K 9/3258
                                                         340/928
(Continued)

FOREIGN PATENT DOCUMENTS

EP     2 869 566 A1    5/2015
JP     2009-027550 A   2/2009
(Continued)

*Primary Examiner* — Paulos M Natnael
(74) *Attorney, Agent, or Firm* — Keating & Bennett, LLP

(57) ABSTRACT

A service information processing unit acquires, from service information of content, current information that indicates luminance information of a video at a current time point and preannouncement information that indicates luminance information of the video after a given time from the current time point, a level control unit, when a luminance range indicated by the preannouncement information changes from a luminance range of the video at the current time point, changes a luminance range more gently compared to a change of the luminance range, and a display unit displays the video in the luminance range defined by the level control unit.

9 Claims, 14 Drawing Sheets

(51) Int. Cl.
*H04N 21/431* (2011.01)
*H04N 21/4402* (2011.01)
*H04N 21/485* (2011.01)
*H04N 9/64* (2006.01)
*H04N 21/434* (2011.01)
*H04N 11/20* (2006.01)

(52) U.S. Cl.
CPC ....... *H04N 21/431* (2013.01); *H04N 21/4345* (2013.01); *H04N 21/4402* (2013.01); *H04N 21/4854* (2013.01)

(56) References Cited

U.S. PATENT DOCUMENTS

| | | | | |
|---|---|---|---|---|
| 9,111,330 | B2* | 8/2015 | Messmer | H04N 1/603 |
| 9,596,430 | B2* | 3/2017 | Takahashi | H04N 21/431 |
| 9,788,020 | B2* | 10/2017 | Takahashi | H04N 21/4854 |
| 9,918,099 | B2* | 3/2018 | Takahashi | H04N 21/431 |
| 2006/0239675 | A1* | 10/2006 | Iizuka | H04B 10/1125 396/287 |
| 2009/0022396 | A1* | 1/2009 | Watanabe | G06K 9/4633 382/167 |
| 2012/0242910 | A1* | 9/2012 | Ivashin | H04N 9/3147 348/745 |
| 2014/0285531 | A1* | 9/2014 | Dasher | G09G 5/10 345/690 |
| 2016/0134832 | A1* | 5/2016 | Yamamoto | H04N 19/70 386/248 |
| 2016/0189409 | A1* | 6/2016 | Aiba | G09G 5/14 345/629 |
| 2017/0228908 | A1* | 8/2017 | Aiba | G06T 11/60 |
| 2018/0054660 | A1* | 2/2018 | Hwang | H04N 21/234 |
| 2018/0109743 | A1* | 4/2018 | Oh | H04N 5/355 |
| 2018/0219764 | A1* | 8/2018 | Oh | H04L 29/06 |

FOREIGN PATENT DOCUMENTS

| | | |
|---|---|---|
| JP | 2011-109395 A | 6/2011 |
| WO | 2013/059116 A1 | 4/2013 |

* cited by examiner

FIG. 5

| DATA STRUCTURE | BIT NUMBER | CONTENT |
|---|---|---|
| MMT_Package_Table () { | | |
| table_id | 8 | TABLE IDENTIFICATION, 0x20: COMPLETE STRUCTURE, 0x11–0x1F: SUBSET |
| version | 8 | VERSION IDENTIFICATION |
| length | 16 | LENGTH OF PRESENT TABLE |
| reserved | 6 | #UNUSED |
| MPT_mode | 2 | MPT MODE, OPERATION WHEN MPT IS DIVIDED INTO SUBSETS |
| MMT_package_id_length | 8 | PACKAGE ID LENGTH, LENGTH OF PACKAGE ID BYTE (MMT_package_id_byte) |
| for (i=0; i<N; i++) { | | |
| MMT_package_id_byte; | 8 | PACKAGE ID BYTE, INDICATING PACKAGE ID, VALUES OF LOWER 16 BITS ARE THE SAME AS THOSE OF SERVICE IDENTIFICATION |
| } | | |
| MPT_descriptors_length | 16 | MPT DESCRIPTOR LENGTH, LENGTH OF MPT DESCRIPTOR AREA |
| for (i=0; i<N; i++) { | | |
| MPT_descriptors_byte | 8 | MPT DESCRIPTOR AREA |
| } | | |
| number_of_assets | 8 | ASSET NUMBER |
| for (i=0; i<N; i++) { | | |
| identifier_type | 8 | IDENTIFIER TYPE, ID SYSTEM OF MMTP PACKET FLOW |
| asset_id_scheme | 32 | ASSET ID SCHEME |
| asset_id_length | 8 | ASSET ID LENGTH |
| for (j=0; j<M; j++) { | | |
| asset_id_byte | 8 | ASSET ID |
| } | | |
| asset_type | 32 | ASSET TYPE, HEVC VIDEO, ISO/IEC 14496 SOUND ETC. |
| reserved | 7 | #UNUSED |
| asset_clock_relation_flag | 1 | CLOCK INFORMATION FLAG |
| location_count | 8 | LOCATION NUMBER, NUMBER OF PIECES OF LOCATION INFORMATION OF ASSET |
| for (j=0; j<M; j++) { | | |
| MMT_general_location_info () | | LOCATION INFORMATION, LOCATION INFORMATION OF ASSET |
| } | | |
| asset_descriptors_length | 16 | ASSET DESCRIPTOR LENGTH, LENGTH OF ASSET DESCRIPTOR AREA |
| for (j=0; j<M; j++) { | | |
| asset_descriptors_byte | 8 | ASSET DESCRIPTOR AREA, AREA IN WHICH ASSET DESCRIPTOR IS STORED |
| } | | |
| } | | |

FIG. 6

| DATA STRUCTURE | BIT NUMBER | CONTENT |
|---|---|---|
| Video_Component_Descriptor () { | | |
|   descriptor_tag | 16 | DESCRIPTOR TAG, 0x8010: VIDEO COMPONENT DESCRIPTOR |
|   descriptor_length | 16 | DESCRIPTOR LENGTH, SIZE OF AREA OF PRESENT DESCRIPTOR |
|   video_resolution | 4 | RESOLUTION OF VIDEO SIGNAL |
|   video_aspect_ratio | 4 | ASPECT RATIO OF VIDEO SIGNAL |
|   video_scan_flag | 1 | VIDEO SCAN FLAG |
|   reserved | 2 | #UNUSED |
|   video_frame_rate | 5 | FRAME RATE OF VIDEO SIGNAL |
|   component_tag | 16 | COMPONENT TAG |
|   ISO_639_language_code | 24 | LANGUAGE CODE |
|   for (i=0; i<N; i++) { | | |
|     text_char | 8 | COMPONENT DESCRIPTION |
|   } | | |
| } | | |

FIG. 7

| video_hdr_flag | MEANING |
|---|---|
| 0 | SDR |
| 1 | HDR |

FIG. 8

| DATA STRUCTURE | BIT NUMBER | CONTENT |
|---|---|---|
| MH-Event_Information_Table() { | | |
|   table_id | 8 | TABLE IDENTIFICATION, 0x8B: CURRENT AND NEXT PROGRAMS OF OWN STREAM, 0x8C-0x9B: SCHEDULE OF OWN STREAM |
|   section_syntax_indicator | 1 | INDICATE SECTION SYNTAX |
|   reserved_future_use | 1 | #UNUSED |
|   reserved | 2 | #UNUSED |
|   section_length | 12 | SECTION LENGTH, LENGTH OF PRESENT TABLE |
|   service_id | 16 | SERVICE IDENTIFICATION, INFORMATION FOR IDENTIFYING PRESENT SERVICE FROM OTHER SERVICE IN TLV STREAM |
|   reserved | 2 | #UNUSED |
|   version_number | 5 | VERSION NUMBER, VERSION NUMBER OF SUB-TABLE, ADD BY ONE EACH TIME INFORMATION OF SUB-TABLE IS CHANGED |
|   current_next_indicator | 1 | INFORMATION INDICATING WHETHER SUB-TABLE IS USED CURRENT TIME OR USED NEXT TIME |
|   section_number | 8 | SECTION NUMBER, SAME TABLE IDENTIFICATION, SERVICE IDENTIFICATION, TLV (Type Length Value) STREAM IDENTIFICATION ADD BY ONE EACH TIME SECTION HAVING ORIGINAL NETWORK IDENTIFICATION IS ADDED |
|   last_section_number | 8 | LAST SECTION NUMBER, LAST SECTION NUMBER OF SUB-TABLE TO WHICH CORRESPONDING SECTION BELONGS |
|   tlv_stream_id | 16 | TLV STREAM IDENTIFICATION, INFORMATION FOR IDENTIFYING PRESENT TLV STREAM FROM OTHER MULTIPLEXING IN DISTRIBUTION SYSTEM THEREOF |
|   original_network_id | 16 | ORIGINAL NETWORK IDENTIFICATION, NETWORK IDENTIFICATION OF ORIGINAL DISTRIBUTION SYSTEM |
|   segment_last_section_number | 8 | SEGMENT LAST SECTION NUMBER, LAST SECTION NUMBER OF PRESENT SEGMENT OF SUB-TABLE |
|   last_table_id | 8 | LAST TABLE IDENTIFICATION, LAST TABLE IDENTIFICATION IN USE |
|   for(i=0;i<N;i++) { | | |
|     event_id | 16 | EVENT IDENTIFICATION, IDENTIFICATION NUMBER OF EVENT |
|     start_time | 40 | START TIME, START TIME OF EVENT |
|     duration | 24 | DURATION TIME, DURATION TIME OF EVENT |
|     running_status | 3 | RUNNING STATUS, '1': NOT EXECUTED, '3': STOPPED, '4': IN EXECUTION |
|     free_CA_mode | 1 | INDICATING WHETHER OR NOT STREAM IN EVENT IS SCRAMBLED BY CA (CONDITIONAL ACCESS) SYSTEM |
|     descriptors_loop_length | 12 | DESCRIPTOR LOOP LENGTH, BYTE LENGTH OF DESCRIPTOR descriptor() |
|     for(i=0;i<N;i++) { | | |
|       descriptor() | | DESCRIPTOR AREA, AREA IN WHICH DESCRIPTOR IS STORED |
|     } | | |
|   } | | |
|   CRC_32 | 32 | CRC VALUE CALCULATED BY CRC32 (CYCLIC REDUNDANCY CHECK) |
| } | | |

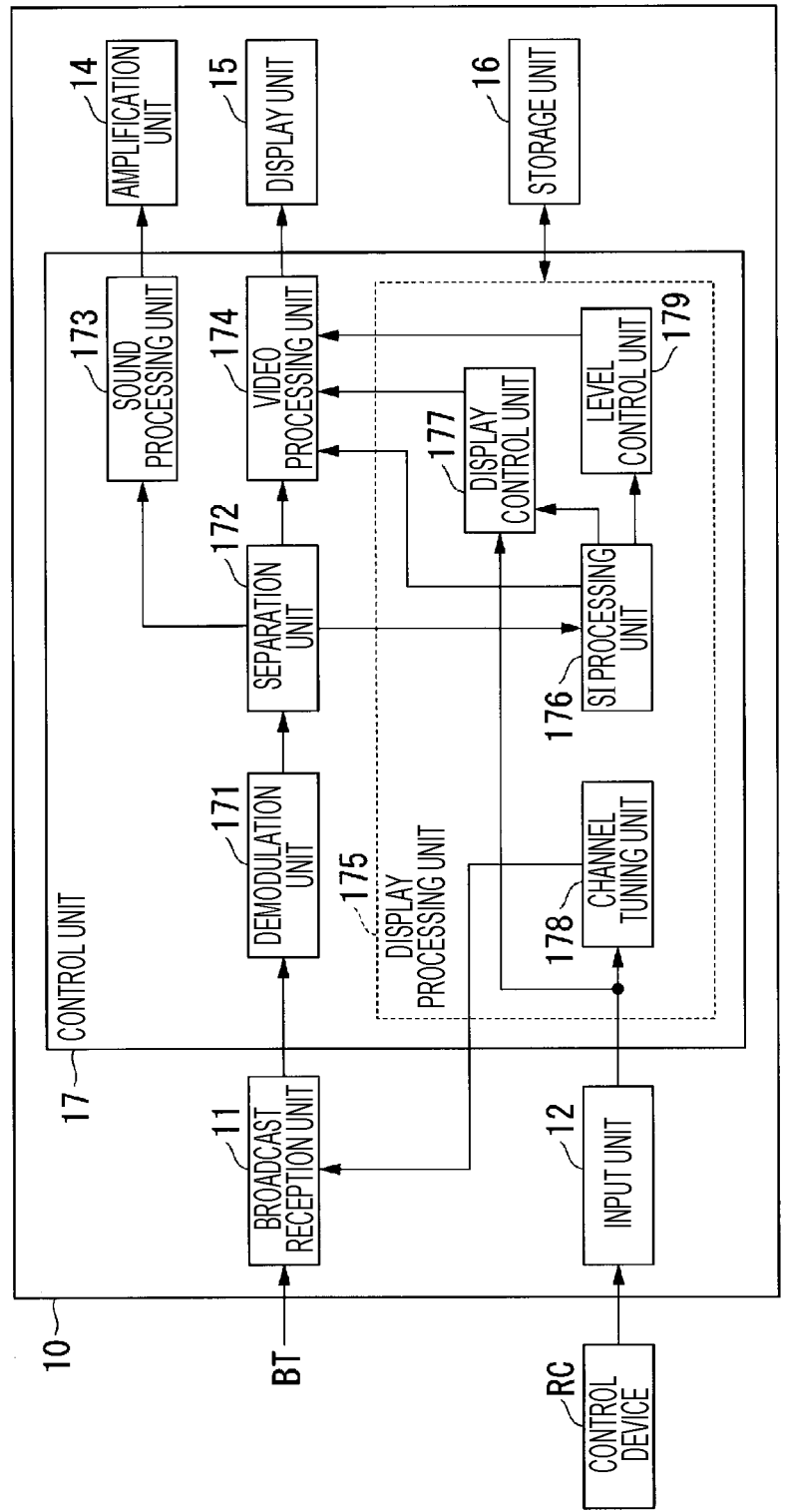

FIG. 11
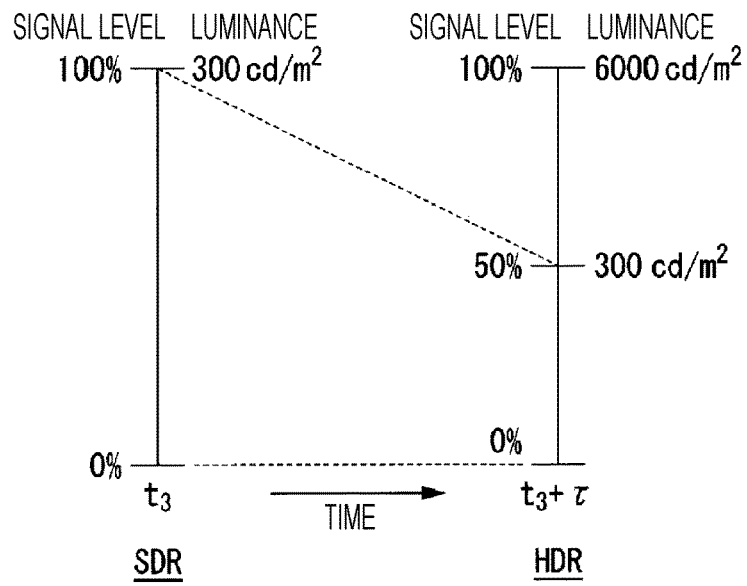
(a)
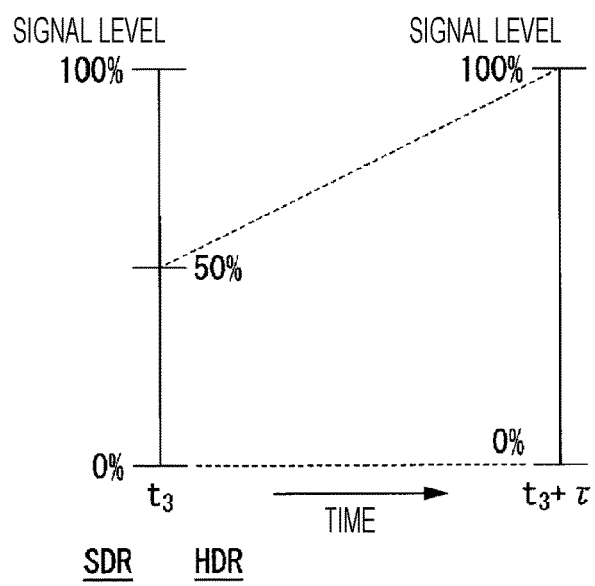
(b)

RECEPTION DEVICE, BROADCAST SYSTEM, RECEPTION METHOD, AND PROGRAM

TECHNICAL FIELD

An embodiment of the present invention relates to a reception device, a broadcast system, a reception method, and a program that comfortably control luminance when broadcast videos whose dynamic ranges are different are switched.

This application claims priority based on Japanese Patent Application No. 2015-164794 filed in Japan on Aug. 24, 2015, the content of which is incorporated herein.

BACKGROUND ART

With development of a sensor technique and an image processing technique, interest in an HDR (High Dynamic Range; also referred to as a wide-band dynamic range) video is enhanced and it is attempted to exploit the HDR video. The HDR video is a video that has luminance in a wider range than that of a normal video. On the other hand, the normal video is called an LDR (Low Dynamic Range) video or an SDR (Standard Dynamic Range) video. The HDR video is expected to be introduced in broadcast service in the future.

However, the HDR video is not always provided in the broadcast service. It is expected that the HDR video or the SDR video is used properly depending on a program. In this case, not only in a normal program, but between advertisements (CM: Commercial Advertisement) mainly aiming at advertising of various goods and service, a luminance range of a video that is broadcasted is switched between the HDR and the SDR in some cases. Thus, a reception device is required to cope with a change of the luminance range as the program is switched.

Then, a technical requirement under which a transmission device adds luminance information which indicates whether a luminance range is the HDR or the SDR to content to be broadcasted and a reception device sets various parameters on the basis of the luminance information has been standardized. The parameters include peak luminance, and contrast, for example. The parameters are set aiming that a video that is adjusted to have luminance and contrast as intended by a transmission side is viewed on a reception side.

PTL 1 describes a reception device including a trigger detection unit that detects a trigger for a start of CM broadcasting and a trigger for an end of CM broadcasting from a television broadcast signal. When the trigger for the start of CM broadcasting is detected, the reception device calculates a feature quantity of the television broadcast signal immediately after the trigger. When the calculated feature quantity is stored in a CM database with indication of being a CM, the reception device determines that the television broadcast signal is a CM. The reception device causes a CM database unit to store a time until the trigger for the end of CM broadcasting is detected after the trigger for the start of CM broadcasting is detected and the calculated feature quantity, and when the number of times that the time and the feature quantity are detected is a given number of times or more, the reception device causes the CM database unit to store the feature quantity and indication of being a CM.

CITATION LIST

Patent Literature

PTL 1: Japanese Unexamined Patent Application Publication No. 2011-109395

SUMMARY OF INVENTION

Technical Problem

However, when luminance suddenly changes in accordance with detection of luminance information as content is switched, a viewer who views a video may be made uncomfortable or his/her physical condition may be affected. An error on a transmission side or an error of luminance information due to a defect of the reception device may cause an unnecessary change of luminance.

The invention was made in view of such circumstances and provides a reception device, a broadcast system, a reception method, and a program that are able to prevent or reduce uncomfortableness or a poor physical condition of a viewer due to a sudden change in luminance.

Solution to Problem

The invention was made to solve the aforementioned problems and provides a reception device including: a service information processing unit that acquires, from service information of content, current information that indicates luminance information of a video at a current time point and preannouncement information that indicates luminance information of the video after a given time from the current time point; a level control unit that, when a luminance range indicated by the preannouncement information changes from a luminance range of the video at the current time point, changes a luminance range more gently compared to a change of the luminance range; and a display unit that displays the video in the luminance range defined by the level control unit.

Advantageous Effects of Invention

According to an embodiment of the invention, it is possible to prevent or reduce uncomfortableness or a poor physical condition of a viewer due to a sudden change in luminance.

BRIEF DESCRIPTION OF DRAWINGS

FIG. 5 illustrates an example of a data structure of an MPT.

FIG. 6 illustrates an example of a data structure of a video component descriptor.

FIG. 7 illustrates an example of setting of a luminance flag.

FIG. 8 illustrates an example of a data structure of an MH-EIT.

FIG. 9 is a schematic block diagram illustrating a configuration of a reception device according to the first embodiment.

FIG. 11 illustrates an example of control for a luminance range according to the first embodiment.

DESCRIPTION OF EMBODIMENTS

Hereinafter, embodiments of the invention will be described with reference to drawings.
[First Embodiment]
First, an outline of a broadcast system 1 according to a first embodiment of the invention will be described.

Figure 1:
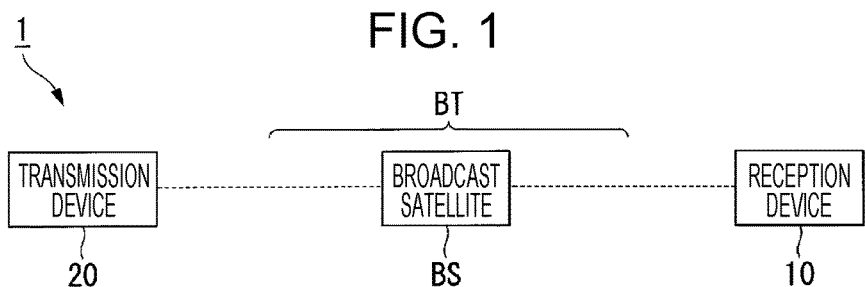
FIG. 1 is a schematic block diagram illustrating a configuration of a broadcast system according to a first embodiment.

FIG. 1 is a schematic block diagram illustrating a configuration of the broadcast system 1 according to the present embodiment.

The broadcast system 1 is configured by including a transmission device 20 and a reception device 10.

The transmission device 20 transmits broadcast program data, which indicates a broadcast program, to a reception device via a broadcasting transmission path BT. The broadcasting transmission path BT is a transmission path in which the broadcast program data is unilaterally and simultaneously transmitted to multiple unspecified reception devices 10. The broadcasting transmission path BT is, for example, a broadcast wave that has a given frequency band. The broadcasting transmission path BT may be configured by including a broadcast satellite BS that relays the broadcast wave. In a part of the broadcasting transmission path BT, a network, for example, a dedicated line or a VPN (Virtual Private Network) may be included. The reception device 10 receives broadcast program data that is transmitted via the broadcasting transmission path BT. The reception device 10 displays a video based on video data that constitutes the received broadcast program data. The reception device 10 is electronic equipment, for example, such as a television reception device, that is able to receive broadcast program data and display a video related to the received broadcast program data. Though the numbers of transmission devices 20 and reception devices 10 are typically multiple, description will be given below by assuming that each of the numbers is one. A case where the broadcast system 1 uses an MMT (MPEG Media Transport) system as a media transport system is taken as an example.

The broadcast system 1 is able to broadcast a plurality of broadcast programs whose dynamic ranges of luminance are different from each other. In other words, an HDR broadcast program and an SDR broadcast program are broadcasted in the broadcast system 1. The HDR broadcast program is a broadcast program in which an HDR video whose luminance range is an HDR is included as a component. The SDR broadcast program is a broadcast program in which an SDR video whose luminance range is an SDR is included as a component. Video data indicating the HDR video and video data indicating the SDR video are respectively called HDR video data and SDR video data.
(Luminance of Video)

There are two types of luminance; optical luminance and image luminance. The optical luminance is a physical amount indicating brightness of a light source. The optical luminance is used for indicating brightness of a display, for example. In the present embodiment, a luminance range of 0 to 6000 $cd/m^2$ is referred to as the HDR and a luminance range of 0 to 300 $cd/m^2$ is referred to as the SDR, for example. That is, the HDR indicates a wider dynamic range of the optical luminance than that of the SDR. Note that, the luminance ranges of the HDR and the SDR are not limited to the aforementioned ranges, and may be defined as any ranges in accordance with the broadcast system, for example. Hereinafter, the dynamic range of the optical luminance is simply called a dynamic range in some cases. The image luminance means luminance represented by a signal level indicating brightness of a video or a relative value thereof. Hereinafter, each of the optical luminance and the image luminance is simply called luminance in some cases.

The broadcast system 1 transmits broadcast program data that includes HDR video data or SDR video data. The HDR video data is constituted by a video format defined by the Rec. ITU-R (International Telecommunication Union-Radiocommunication Sector) BT. 2020, for example. The video format is called an HDR format. The HDR format is able to be applied also to the SDR video data and used for a UHDTV (Ultra-High Definition Television). A case where the video data is data represented by a color space of YCbCr will be described below, for example. In this case, a video source may be data represented by another color space such as a color space of RGB.

Figure 2:
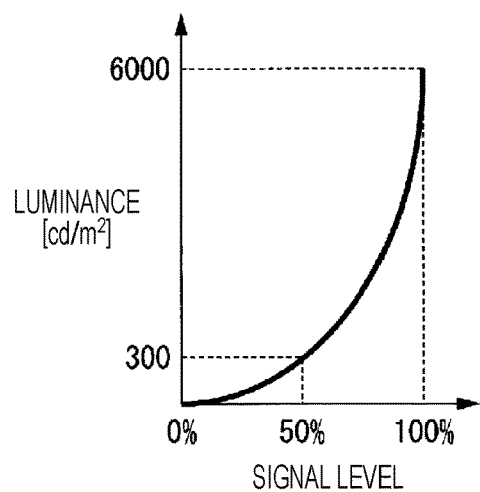
FIG. 2 illustrates an example of a relationship between a signal level and luminance.

In the HDR format, a signal level of the image luminance and the HDR as the luminance range are associated with each other. For example, as illustrated in FIG. 2, in the HDR format, the signal level of the image luminance of 0 to 50% corresponds to the optical luminance of 0 to 300 $cd/m^2$, and the signal level of the image luminance of 50 to 100% corresponds to the optical luminance of 300 to 6000 $cd/m^2$, for example. Thus, in the HDR video data transmitted by the HDR format, the signal level of the image luminance may take a range of 0 to 100%. Hereinafter, a possible range of the signal level for video data is referred to as a level range. In the present example, a minimum value (for example, black level) and a maximum value (for example, nominal peak) of a signal value of each pixel that constitutes the HDR video data respectively correspond to 0% and 100%. In a case where the signal value of each pixel is represented by 12 bits, the signal values of the black level and the nominal peak are respectively 64 and 3840, for example.

Figure 3:
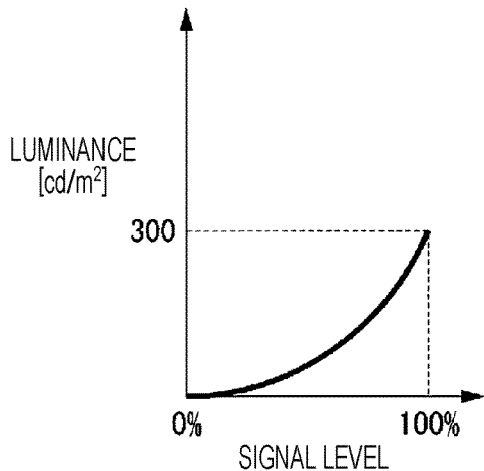
FIG. 3 illustrates another example of a relationship between a signal level and luminance.

The SDR video data has a video format defined by the Rec. ITU-R BT. 709, for example. The video format is called an SDR format. The SDR format is used for an HDTV (High Definition Television). In the SDR format, a signal level of the image luminance and the SDR are associated with each other. For example, as illustrated in FIG. 3, in the SDR format, the level range of 0 to 100% corresponds to the optical luminance of 0 to 300 $cd/m^2$. The signal level of the image luminance of the SDR video data may take a range of 0 to 100%. In the present example, a minimum value and a maximum value of a signal value of each pixel that constitutes the SDR video data respectively correspond to 0% and 100%. In a case where the signal value of each pixel is represented by 10 bits, the signal values of the black level and the nominal peak are respectively 16 and 960, for example.

In the following description, a case where the optical luminance corresponding to a range of 0 to 50% in the range of the image luminance of the HDR video mainly has a range (0 to 300 cd/m$^2$) of the optical luminance corresponding to the range (0 to 100%) of the image luminance of the SDR video is taken as an example.

Next, a display unit 15 (FIG. 9) included in the reception device 10 will be described. The display unit 15 may be constituted as a display device separate from the reception device 10. The display unit 15 is a display capable of displaying videos of both the HDR and the SDR as the range of the optical luminance. Specifically, in a case where the signal level of the image luminance in an HDR video signal that is input is 0 to 50 [%], the display unit 15 performs display with the optical luminance of 0 to 300 [cd/m$^2$]. In a case where the signal level is 50 to 100 [%], the display unit 15 performs display with the optical luminance of 300 to 6000 [cd/m$^2$]. Specifically, the display unit 15 performs display with the optical luminance according to the signal level of the image luminance on the basis of an electro optical transfer function (EOTF) exemplified in FIG. 2, for example. The EOTF is a function that describes a correspondence relation between the signal value of the luminance input to the display and the luminance displayed by the display.

(Outline of Processing)

Next, an outline of processing from when video data for a broadcast program is captured till when a video is displayed on the display unit 15 will be described. Here, for example, it is set that an image capturing device (not illustrated) for video data captures objects SU1 and SU2 and pieces of optical luminance of the objects SU1 and SU2 are respectively 200 and 2000 [cd/m$^2$]. While the optical luminance of the object SU1 is in the range of the SDR, the optical luminance of the object SU2 exceeds an upper limit of the SDR. As a component of broadcast program data, the transmission device 20 transmits, to the reception device 10, the captured video data as SDR video data or HDR video data. The reception device 10 acquires the video data from the broadcast program data received from the transmission device 20 and outputs the acquired video data to the display unit 15.

In a case where the video data is the SDR video data, a signal level of the object SU1 is in a range of 0 to 100%. On the other hand, a signal level corresponding to the optical luminance of the object SU2 exceeds 100% and is thus 100%. Therefore, while the display unit 15 displays the object SU1 with the optical luminance within a range of 200 cd/m$^2$, the optical luminance with which the object SU2 is displayed is suppressed to an upper limit thereof, 300 cd/m$^2$.

In a case where a video source is the HDR video data, the signal levels of the objects SU1 and SU2 are within ranges of 0 to 50% and 50 to 100%. Therefore, the display unit 15 displays the objects SU1 and SU2 respectively with pieces of optical luminance of 200 and 2000 [cd/m$^2$] that are equal to the pieces of optical luminance obtained by the capturing.

As described above, in the HDR video displayed by HDR display, the luminance range in which the optical luminance obtained by the capturing corresponds to the signal level of the image luminance is wider than that of the SDR video. Thus, the object SU1 and the object SU2 are represented with different optical luminance.

In a case where the luminance range of the video is switched between the HDR and the SDR, the reception device 10 changes, with respect to the display unit 15, setting of a range of the signal level and the EOTF which indicates a relationship between signal luminance and optical luminance. Since the luminance range of the video that is able to be represented is switched by changing the setting, the luminance of the video changes. The change in the luminance of the video may bring a cause of making a viewer uncomfortable or affecting his/her physical condition.

Then, the reception device 10 according to the present embodiment acquires, from service information of a broadcast program, luminance information of a video included in the broadcast program, and when a luminance range indicated by the luminance information changes and the broadcast program is changed, immediately changes setting of the luminance range from the luminance range before the change to a luminance range after the change. When the luminance range indicated by the luminance information changes and the program is not changed, the reception device 10 gradually changes the setting of the luminance range from the luminance range before the change to a luminance range after the change. The reception device 10 causes the display unit 15 to display the video with a defined luminance range.

(Configuration of Transmission Device)

Next, a configuration of the transmission device 20 according to the present embodiment will be described.

Figure 4:
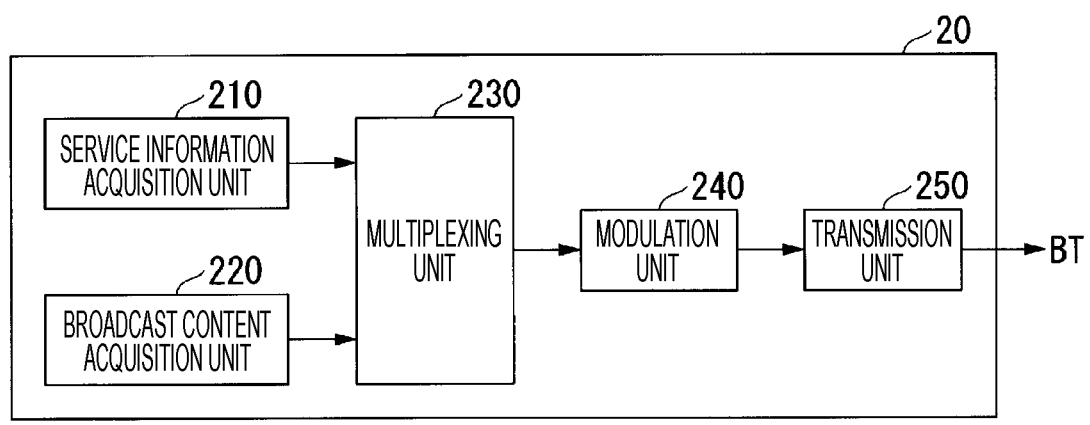
FIG. 4 is a schematic block diagram illustrating a configuration of a transmission device according to the first embodiment.

FIG. 4 is a schematic block diagram illustrating the configuration of the transmission device 20 according to the present embodiment.

The transmission device 20 multiplexes broadcast program data and service information and transmits, on a broadcast wave, the multiplexed data obtained through the multiplexing. The transmission device 20 is configured by including a service information acquisition unit 210, a broadcast content acquisition unit 220, a multiplexing unit 230, a modulation unit 240, and a transmission unit 250.

The service information acquisition unit 210 acquires service information. The service information is information about provision of broadcast service, such as a provision form or configuration of a broadcast program. The service information is, for example, MMT-SI (Service Information) in the MMT system. The MMT-SI information includes, for example, an MPT (MMT Package Table) and an MH-EIT (MH-Event Information Table). The MPT is a table that includes information indicating an asset that is a component of the broadcast program, that is, a list of videos or sounds, or a providing condition thereof. The MH-EIT is a table that includes information about the program, for example, information indicating a name of the program, broadcast date and time, explanation for broadcast content, or the like. A luminance flag indicating luminance information of the video to be broadcasted is included in the MPT, for example. In other words, the luminance flag indicates whether the luminance range is the HDR or the SDR. The MH-EIT (MH-Event Information Table) that is a table for transmitting information about the program, such as a name of the program, broadcast date and time, or explanation for broadcast content is included. The service information acquisition unit 210 outputs the acquired service information to the multiplexing unit 230 every given time (for example, 0.1 to 0.5 ms). The service information is updated in accordance with progress of the program, but when not updated, the same service information may be iterated multiple times. Thereby, the broadcast program is able to be presented on the basis of a broadcast signal received at any time point by the reception device 10.

The broadcast content acquisition unit 220 acquires broadcast program data. The broadcast program data is data indicating content of the broadcast program. The broadcast program data includes, for example, video data, sound data, and the like that are provided in the broadcast program. The broadcast content acquisition unit 220 outputs the acquired broadcast program data to the multiplexing unit 230.

The multiplexing unit 230 multiplexes the service information input from the service information acquisition unit 210 and the broadcast program data input from the broadcast content acquisition unit 220 to generate multiplexed data. The multiplexing unit 230 outputs the multiplexed data that is generated to the modulation unit 240.

The modulation unit 240 modulates the multiplexed data input from the multiplexing unit 230, generates a broadcast signal having a given broadcast frequency band, and outputs the generated broadcast signal to the transmission unit 250.

The transmission unit 250 outputs, to the broadcasting transmission path BT, a transmission signal input from the modulation unit 240.

Thereby, the broadcast signal that carries the multiplexed data in which the broadcast program data and the service information are multiplexed is transmitted via the broadcasting transmission path BT. The broadcast signal is transmitted as a broadcast wave, for example.

(MPT)

Next, a data structure of an MPT will be described.

FIG. 5 illustrates an example of the data structure of the MPT. The MPT is configured by including an asset type (asset_type) and an asset descriptor area (asset_descriptors_byte) of each asset. The asset type (asset_type) is information indicating a type of an asset. For example, an asset in which "hvc1" is described as the asset type indicates a video and an asset in which "mp4a" is described as the asset type indicates sound.

The asset descriptor area is an area in which a descriptor describing information about an asset is stored. In the asset descriptor area, a video component descriptor (Video_Component_Descriptor) is described, for example.

(Video Component Descriptor)

Next, a video component descriptor will be described.

FIG. 6 illustrates an example of a data structure of the video component descriptor. The video component descriptor is a descriptor indicating a parameter or explanation related to a video component. The video component descriptor includes an unused parameter (reserved) and component description (text_char). In the present embodiment, a luminance flag as luminance information is described in either the unused parameter (reserved) or the component description (text_char). With the luminance flag, whether the luminance range of a video to be broadcasted is the HDR or the SDR is specified.

(Luminance Flag)

FIG. 7 illustrates an example of setting of a value of the luminance flag. The luminance flag (video_hdr_flag) has 1-bit information and may have a value of 1 or 0 as exemplified in FIG. 7. The value of 0 indicates that the luminance range is the SDR and the value of 1 indicates that the luminance range is the HDR. The luminance range specified with the luminance flag is set to each of a broadcast program, a segment (also called a session) that constitutes one broadcast program, a CM included in one broadcast program, and the like in some cases.

(MH-EIT)

Next, an MH-EIT will be described. FIG. 8 illustrates an example of a data structure of the MH-EIT.

In the example illustrated in FIG. 8, the MH-EIT (MH-Event_Information_Table( )) includes an event identification (event_ID), a start time (start_time), and a duration time (duration). The event identification indicates an identification number of an event. Specifically, the event identification indicates identification information of a program, for example. The start time indicates a start time of the event. That is, the start time indicates a start time (date and time) of the program. The duration time indicates a duration time of the event. That is, the duration time indicates a length of broadcast time of the program.

The MH-EIT also includes a descriptor area (descriptor ( )) of each event identification. The descriptor area is an area in which a descriptor is stored. The MH-EIT is able to include a video component descriptor, for example. The descriptor area is also able to include an MH-extended event descriptor (MH-Extended_Event_Descriptor ( )). In the MH-extended event descriptor, detailed information about each program is described. The detailed information may include, in addition to a performer, a creator, and the like, information of each segment (also called a session) that is a part of a program, such as a provision start time, a duration time, a luminance flag, and the like.

(Reception Device)

Next, a configuration of the reception device 10 according to the present embodiment will be described.

FIG. 9 is a schematic block diagram illustrating the configuration of the reception device 10 according to the present embodiment.

The reception device 10 is configured by including a broadcast reception unit 11, an input unit 12, an amplification unit 14, a display unit 15, a storage unit 16, and a control unit 17.

The broadcast reception unit 11 receives, among broadcast signals transmitted from the transmission device 20 via the broadcasting transmission path BT, a broadcast signal that is transmitted on a channel specified by a channel tuning signal from a channel tuning unit 178 of the control unit 17. The broadcast reception unit 11 is configured by including a tuner that receives a broadcast wave, for example. The tuner receives a broadcast wave of a frequency band corresponding to the channel specified by the channel tuning signal. The broadcast reception unit 11 outputs the received broadcast signal to a demodulation unit 171 of the control unit 17.

To the input unit 12, an operation signal generated by an operation of a user is input. The input unit 12 is configured by including an infrared interface that receives an operation signal from a control device (remote controller) RC by an infrared ray, for example. The operation signal specifies information of on/off of a power supply, a channel on which a broadcast wave is received, a sound volume, luminance, contrast, or the like, for example. The input unit 12 outputs the operation signal to the control unit 17. Note that, the input unit 12 is constituted by including a physical member for receiving the operation of the user, for example, such as various buttons, knobs, and the like, and may generate an operation signal according to the operation.

The amplification unit 14 reproduces sound based on sound data input from a sound processing unit 173 of the control unit 17. The amplification unit 14 is configured by including a speaker, for example.

The display unit 15 reproduces a video based on video data input from a video processing unit 174 of the control unit 17. The display unit 15 is a display capable of displaying an HDR video based on HDR video data and an SDR video based on SDR video data as described above.

The storage unit 16 stores various data such as setting data used in the control unit 17 and data acquired by the control unit 17. The storage unit 16 is configured by including various storage media such as a RAM (Random Access Memory) and a ROM (Read-only Memory). The storage unit 16 may be configured by including a storage medium (for example, BD (Blu-ray (registered trademark) Disc)) in which received video data of a broadcast program or video data of content of a movie or the like produced in advance is stored. In the storage unit 16, broadcast program data and service information which is multiplexed with the broadcast program data may be stored in association with each other.

The control unit 17 performs various processing related to an operation of the reception device 10. The control unit 17 is configured by including the demodulation unit 171, a separation unit 172, the sound processing unit 173, the video processing unit 174, and a display processing unit 175. The display processing unit 175 is configured by including an SI processing unit 176, a display control unit 177, the channel tuning unit 178, and a level control unit 179. The control unit 17 is configured by including a control circuit such as a CPU (Central Processing Unit). The control unit 17 may realize a function of the demodulation unit 171, the separation unit 172, the sound processing unit 173, the video processing unit 174, the display processing unit 175, or the like by executing processing specified by a command indicated by a control program read out from the storage unit 16.

The demodulation unit 171 demodulates a broadcast signal input from the broadcast reception unit 11 and generates multiplexed data. A demodulation scheme used by the demodulation unit 171 is a demodulation scheme according to a modulation scheme used in the modulation unit 240 (FIG. 4). The demodulation unit 171 outputs the multiplexed data that is generated to the separation unit 172.

The separation unit 172 separates broadcast program data and service information from the multiplexed data input from the demodulation unit 171. The separation unit 172 also separates sound data and video data from the broadcast program data. The separation unit 172 outputs the separated sound data to the sound processing unit 173 and outputs the separated video data to the video processing unit 174. The separation unit 172 outputs the separated service information to the display processing unit 175.

The sound processing unit 173 decodes the sound data (that has been coded) input from the separation unit 172 and generates decoded sound data. A sound decoding scheme used by the sound processing unit 173 is a sound decoding scheme (for example, MPEG-4 audio) according to a coding scheme used for coding of the sound data. The sound processing unit 173 outputs the sound data generated by decoding to the amplification unit 14.

The video processing unit 174 decodes the video data (that has been coded), which is input from the separation unit 172, in a luminance range indicated by luminance information input from the SI processing unit 176 and generates decoded video data. A video decoding scheme used by the video processing unit 174 is a video decoding scheme (for example, HEVC: High Efficiency Video Coding) according to a coding scheme used for coding of the video data. In the following description, a video indicated by the video data input from the separation unit 172 is called a broadcast video in some cases. The video processing unit 174 adjusts a display manner of the broadcast video under control of the display processing unit 175. As the display manner, for example, presence/absence of various graphic screens (such as a caution screen, a menu screen, and a guide screen), luminance or contrast of a broadcasted video, that is, of a video indicated by generated video data, or the like is adjusted. The video processing unit 174 superimposes a graphic screen indicated by graphic screen data input from the video processing unit 174 with the decoded video and generates the superimposed video as an adjusted video. For a pixel whose signal level is in a luminance range indicated by luminance range setting input from the level control unit 179 among pixels indicated by the video data, the video processing unit 174 keeps the signal level without change. For a pixel whose signal level is greater (or smaller) than the luminance range indicated by the luminance range setting input from the level control unit 179 among pixels indicated by the video data, the video processing unit 174 sets the signal level as a maximum value (or a minimum value) of the signal level of each luminance range. The video processing unit 174 outputs video data that indicates the adjusted video to the display unit 15.

The display processing unit 175 performs processing related to display of a video. The display processing unit 175 is configured by including the SI processing unit 176, the display control unit 177, the channel tuning unit 178, and the level control unit 179.

The SI processing unit 176 analyzes service information input from the separation unit 172. Specifically, the SI processing unit 176 extracts a video component descriptor of an MPT from the service information and acquires luminance information by referring to a value set to a luminance flag. The SI processing unit 176 outputs the acquired luminance information to the video processing unit 174, the display control unit 177, and the level control unit 179. The SI processing unit 176 extracts an MH-EIT from the service information and outputs program information indicated by the extracted MH-EIT to the display control unit 177 and the level control unit 179.

The display control unit 177 controls whether to display a graphic screen to be displayed on the display unit 15, acquisition or changing of the graphic screen, and the like on the basis of one or both of the operation signal from the input unit 12 and the information from the SI processing unit 176. As the graphic screen, there is a caution screen, a menu screen, or the like, for example. As the menu screen, there is a video setting screen for setting luminance or contrast for display on the display unit 15. As the caution screen, there is a luminance change caution screen for notifying a change, that is, expansion or reduction of the luminance range. The luminance change caution screen for notifying expansion of the luminance range may include, for example, a message of "Video is made brighter suddenly!" or the like as a message for giving a caution about a sudden increase in the luminance due to expansion of the luminance range. Graphic screen data indicating various graphic screens is stored in advance in the storage unit 16.

As the graphic screen, there is a screen that is displayed in accordance with a change of the luminance range of the broadcast video or a screen whose content varies depending on the luminance range of the broadcast video. For example, when the luminance range indicated by luminance information changes, the display control unit 177 starts display of the luminance change caution screen and stops the display after a given time (for example, 5 seconds) has lapsed. When starting the display of the luminance change caution screen, the display control unit 177 reads out, from the storage unit 16, luminance change caution screen data for indicating the luminance change caution screen and outputs the luminance change caution screen data that is read out to the video processing unit 174.

As the video setting screen, there is an HDR video setting screen to be displayed when the luminance range of the broadcast video is the HDR or an SDR video setting screen to be displayed when the luminance range of the broadcast video is the SDR. This is because a range of luminance and a range of contrast that are able to be set vary when the luminance range changes. When the luminance range indicated by the luminance information is the HDR and an operation signal to specify display of the video setting screen is input from the input unit 12, the display control unit 177 reads out HDR video setting screen data from the storage unit 16. The display control unit 177 outputs the HDR video setting screen data that is read out to the video processing unit 174. When the luminance range indicated by the luminance information is the SDR and an operation signal to specify display of the video setting screen is input from the input unit 12, the display control unit 177 reads out SDR video setting screen data from the storage unit 16. The display control unit 177 outputs the SDR video setting screen data that is read out to the video processing unit 174. That is, in accordance with the change of the luminance range, the display control unit 177 changes the video setting screen to be displayed.

The channel tuning unit 178 identifies a channel, on which a broadcast signal is received, by the operation signal input from the input unit 12. The channel tuning unit 178 generates a channel tuning signal to specify the identified channel and outputs the generated channel tuning signal to the broadcast reception unit 11.

The level control unit 179 controls a signal level of the broadcast video on the basis of luminance information and program information that are input from the SI processing unit 176. When a luminance range indicated by the luminance information changes and a program indicated by the program information is changed, the level control unit 179 immediately switches setting of the luminance range set to the video processing unit 174 from the luminance range before the change to a luminance range after the change. In this case, the level control unit 179 outputs setting of the switched luminance range to the video processing unit 174.

On the other hand, when the luminance range indicated by the luminance information changes and the program indicated by the program information is not changed, the display control unit 177 gradually changes the setting of the luminance range from the luminance range before the change to a luminance range after the change. In this case, the level control unit 179 successively outputs, to the video processing unit 174, the setting of the luminance range that is defined for each frame. As a result, the level control unit 179 is able to define, with respect to the video processing unit 174, a range of the signal level of the broadcast video as a range of the signal level according to the luminance range defined by the level control unit 179.

(Time Change of Luminance Range)

Next, an example of a time change of a luminance range of a video that constitutes a broadcast program will be described.

Figure 10:
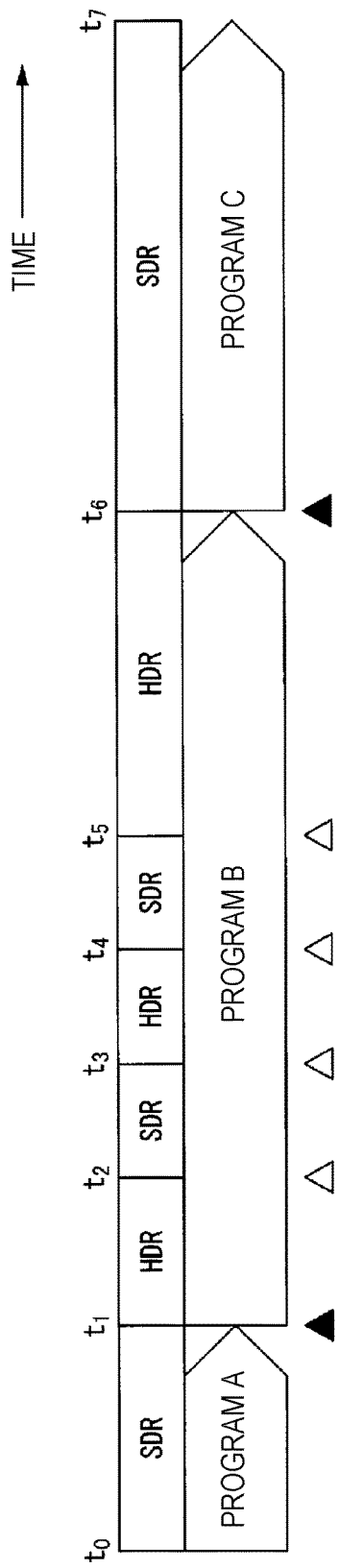
FIG. 10 illustrates an example of a time change of a luminance range of a video.

FIG. 10 illustrates an example of a time change of a luminance range of a video.

In the example illustrated in FIG. 10, a program A that includes an SDR video is broadcasted from a time t0 to a time t1, a program B is broadcasted from the time t1 to a time t6, and a program C that includes an SDR video is broadcasted from the time t6 to a time t7. In the program B, the luminance range of the video is switched. The luminance range may change as a session (also called a segment) that is a part of the program is switched. In the example illustrated in FIG. 10, the luminance range is switched from the HDR to the SDR at times t2, t4, and t6 and switched from the SDR to the HDR at times t3 and t5.

In FIG. 10, a mark ▲ assigned to times $t_1$ and $t_7$ indicates a timing when the level control unit 179 immediately changes setting of the luminance range. At the times, a change of the program is accompanied by a change of the luminance range notified with SI information. A mark Δ assigned to times $t_2$, $t_3$, $t_4$, and $t_5$ indicates a timing when the level control unit 179 gradually changes the setting of the luminance range over a given time τ (for example, 2 to 3 seconds). In the following description, the time τ is called a luminance transition time.

Note that, the display control unit 177 may perform switching of a graphic screen (display of the luminance change caution screen, the video setting screen) according to the change of the luminance range in the same manner regardless of whether or not the change of the program is accompanied.

(Control for Luminance Range)

Next, control for a luminance range by the level control unit 179 according to the present embodiment will be described.

FIG. 11 illustrates an example of control for a luminance range according to the present embodiment. In the example illustrated in FIG. 11, a case where a luminance range specified by SI information is switched at a time $t_3$ from the SDR to the HDR without being accompanied by a change of a program is exemplified. In the example, the level control unit 179 gradually expands the luminance range from the SDR (0 to 300 cd/m$^2$) to the HDR (0 to 6000 cd/m$^2$) from the time $t_3$ to a time $t_3+\tau$ (refer to FIG. 11(*a*)). The level control unit 179 gradually changes a maximum value of the signal level that constitutes video data from the signal level (50% in the example illustrated in FIG. 11(*b*)) according to the luminance (300 cd/m$^2$) that corresponds to the maximum value of the signal level of the SDR into the signal level (100% in the example illustrated in FIG. 11(*b*)) according to the luminance (6000 cd/m$^2$) that corresponds to the maximum value of the signal level of the HDR, for example. The change is only required to be performed in a continuous manner, for example, linearly with respect to a time change. The continuous manner does not always mean to be mathematically continuous, and the meaning is sufficiently satisfied when one is conscious that the luminance changes in a continuous manner. For example, it is only required that a rate of the change (that is, an amount of the change between frames that are adjacent to each other) of the maximum value of the signal level is smaller than a given threshold of the rate of the change. The level control unit 179 successively sets the defined maximum value to the video processing unit 174. When a signal value exceeding the set maximum value is detected among signal values of pixels that are decoded, the video processing unit 174 defines (clipping) the signal value as the maximum value to limit the signal value between a given minimum value and the set maximum value.

On the other hand, in a case where the luminance range specified by SI information is switched from the HDR to the SDR without being accompanied by a change of a program, the level control unit 179 may change the maximum value of the signal level from the maximum value of the HDR to the maximum value of the SDR over the luminance transition time τ in a continuous manner as described above. In this case, the level control unit 179 starts such processing at a time earlier than a time (for example, time $t_4$), at which the luminance range changes from the HDR to the SDR, by the luminance transition time τ.

Note that, the video data transmitted by the transmission device 20 may be obtained by multiplying a signal value by an OETF (Opto-Electronic Transfer Function) in advance in order to offset characteristics of the EOTF (reference EOTF) in a specific display device. The level control unit 179 uses a given correction coefficient to correct a signal value that is limited, so that a last output value (luminance) from the display unit 15 has a constant magnification with respect to an original input value of the video data. The correction is called gamma correction in some cases. The correction coefficient may be provided as a conversion table indicating a relationship between the input value and the output value. The correction coefficient may be different between the SDR and the HDR. For example, the level control unit 179 may immediately switch the correction coefficient of the SDR to the correction coefficient of the HDR at the time $t_3$ when it is instructed to change the luminance range from the SDR to the HDR. The level control unit 179 may immediately switch the correction coefficient of the HDR to the correction coefficient of the SDR at the time t4 when it is instructed to change the luminance range from the HDR to the SDR.

The level control unit 179 uses a correction coefficient corresponding to a signal value whose maximum value is limited and corrects the signal value.

Next, control for a luminance range according to the present embodiment will be described.

Figure 12:
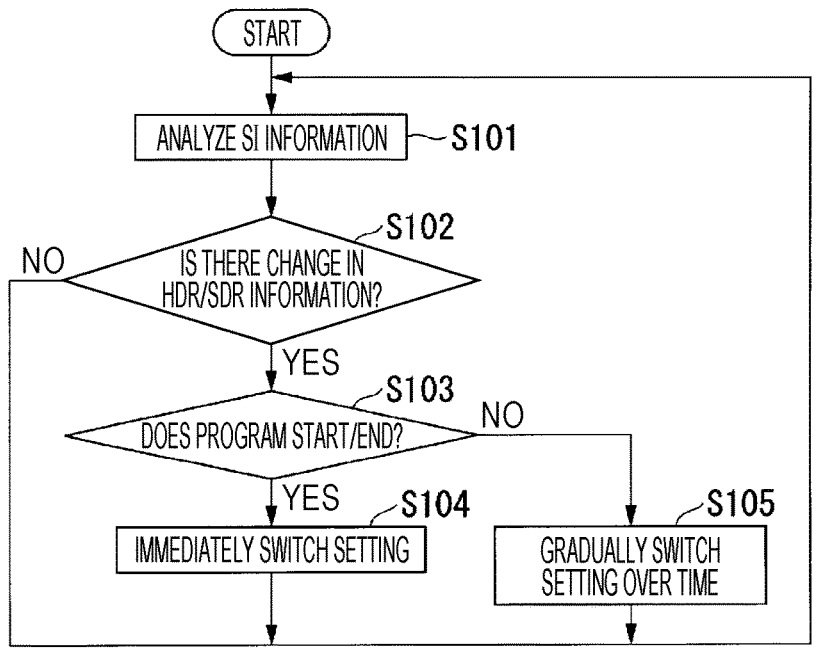
FIG. 12 is a flowchart indicating control for a luminance range according to the first embodiment.

FIG. 12 is a flowchart indicating control for a luminance range according to the present embodiment.

(Step S101) The separation unit 172 separates service information from multiplexed data that is carried by a received broadcast signal. The SI processing unit 176 analyzes the separated service information and acquires luminance information and program information. Then, the procedure proceeds to processing of step S102.

(Step S102) The level control unit 179 determines whether or not the luminance range indicated by the luminance information changes from the HDR to the SDR or from the SDR to the HDR. When it is determined that there is a change (step S102, YES), the procedure proceeds to processing of step S103. When it is determined that there is no change (step S102, NO), the procedure returns to processing of step S101.

(Step S103) The level control unit 179 refers to the program information to determine whether or not the program that has been broadcasted up to that time ends and a new program starts. When it is determined that a new program starts (step S103, YES), the procedure proceeds to processing of step S104. When it is determined that a new program does not start (step S103, NO), the procedure proceeds to processing of step S105.

(Step S104) The level control unit 179 immediately switches setting of the luminance range of a video from setting of the luminance range before the change to setting of a luminance range after the change. Then, the procedure returns to processing of step S101.

(Step S105) The level control unit 179 gradually changes the setting of the luminance range of the video from setting of the luminance range before the change to setting of the luminance range after the change over a given luminance transition time T. Then, the procedure returns to processing of S101.

(Modified Example)

Control for a luminance range according to the present embodiment may be performed as described below.

(I) A luminance transition time $\tau_{HS}$ when the luminance range specified by SI information is reduced from the HDR to the SDR may be shorter than a luminance transition time $\tau_{SH}$ when the luminance range is expanded from the SDR to the HDR. For example, in a case where the luminance transition time $\tau_{SH}$ is 2 seconds, the luminance transition time $\tau_{HS}$ may be 0.5 second or less. In a case where the luminance range specified by SI information is reduced from the HDR to the SDR, the level control unit 179 may immediately switch the setting of the luminance range.

This is because there is a greater need to gradually change the setting as a safety design in the case of expansion of the luminance range from the SDR to the HDR, which causes a sudden increase in the luminance or contrast. This is also because, according to visual perception of a human, the increase in the luminance or contrast typically gives a stronger impression to the viewer compared to a case where the luminance or contrast is reduced, and thus brings a more significant cause of making the viewer uncomfortable or affecting his/her physical condition. In a case where the luminance range is reduced from the HDR to the SDR, a start of processing of the reduction needs to be applied to video data that is received at a time (for example, time $t_4$-$\tau_{HS}$) earlier than a time (for example, time $t_4$) when the luminance range changes from the HDR to the SDR by the luminance transition time $\tau_{HS}$, so that a start of processing needs to be delayed by at least the luminance transition time $\tau_{HS}$. By reducing or eliminating the luminance transition time $\tau_{HS}$, a delay time required from reception of a broadcast signal to display of a video is shortened.

(II) The level control unit 179 may successively acquire luminance information included in SI information every given time, and determine a change of a luminance range by using luminance information acquired a plurality of times up to that time. Here, for example, when the luminance range indicated by the luminance information changes and the changed luminance range is then iterated a given number of times (number of times of determination), the level control unit 179 decides the change of the luminance range with respect to the changed luminance range. The level control unit 179 changes the setting of the luminance range as described above on the basis of the decided change of the luminance range. Thereby, the level control unit 179 is able to prevent an unnecessary change of the luminance range due to a temporal error of luminance information caused by noise, erroneous transmission, or the like.

At this time, the number of times of determination for determining that the luminance range is expanded from the SDR to the HDR may be greater than the number of times of determination for determining that the luminance range is reduced from the HDR to the SDR. The more number of times of determination makes the determination related to expansion of the luminance range more difficult than the determination related to the reduction, and is thus more effective for a safety design to prevent uncomfortableness or a poor physical condition of the viewer.

Though a case where the reception device 10 displays a video of a broadcast program based on video data that is carried by a broadcast signal is mainly exemplified above, the aforementioned control for the luminance range may be applied to a case where a video based on video data recorded in the storage unit 16 in advance is displayed. In this case, instead of an input of video data and service information corresponding to the video data from the separation unit 172, in accordance with an input of an operation signal indicating an instruction of recording reproduction from the input unit 12, the video processing unit 174 reads out video data and service information from the storage unit 16. In this case, the SI processing unit 176 also acquires the service information stored in the storage unit 16, instead of an input of the service information from the separation unit 172.

Note that, no change of the luminance range indicated by luminance information is generally caused in video data that is produced in advance. Even when there is a change of the luminance range, the change is not caused frequently. Thus, the display control unit 177 may display a menu screen to select any of the following control modes on the basis of an operation signal from the input unit 12. The control modes are (i) mode 1: setting of the luminance range is gradually changed over the luminance transition time τ in accordance with the change of the luminance range, (ii) mode 2: setting of the luminance range is immediately changed in accordance with the change of the luminance range, and (iii) mode 3: the change of the luminance range is ignored and setting of a certain luminance range is used. The display control unit 177 sets the selected control mode to the level control unit 179 and the level control unit 179 performs the aforementioned control for the luminance range in accordance with the level control mode that is set.

As described above, the reception device 10 according to the present embodiment includes the SI processing unit 176 that acquires, from service information of content, luminance information of a video included in the content. The reception device 10 also includes the level control unit 179 that, when setting of a luminance range changes in accordance with a change of a luminance range indicated by luminance information, changes the setting of the luminance range more gently when the content does not change compared to a case where the content changes. The reception device 10 includes the display unit 15 that displays the video on the basis of the setting of the luminance range defined by the level control unit 179.

According to such a configuration, compared to the change of the luminance range accompanying switching of the content, the change of the luminance range accompanying an instruction given in the middle of the content is reduced more. Thus, it is possible to prevent or reduce uncomfortableness or a poor physical condition of the viewer caused by a sudden change in the luminance during viewing of the content or a sudden change in the luminance due to an unnecessary change of the luminance range because of an error or the like.

When the content changes, the level control unit 179 immediately changes the setting of the luminance range before the change to setting of a luminance range after the change.

According to such a configuration, by quickly responding to the change of the luminance range also upon switching of the content, the content is able to be viewed in a luminance range intended by a broadcasting company or a content creator in a content beginning portion that gives a strong impression to the viewer.

When the luminance range indicated by the luminance information is expanded, the level control unit 179 changes the setting of the luminance range over a longer time compared to a case where the luminance range indicated by the luminance information is reduced.

According to such a configuration, it is possible to reduce a sudden increase in the luminance that becomes a main cause of uncomfortableness or a poor physical condition of the viewer and reduce a processing time required to reduce the luminance range that results in uncomfortableness or a poor physical condition of the viewer. The reduction of the processing time makes it possible for the viewer to view the content in a luminance range intended by a broadcasting company or a content creator as much as possible.

The level control unit 179 successively acquires luminance information and decides a change of the luminance range on the basis of iteration of the luminance range indicated by the luminance information.

According to such a configuration, it is possible to prevent an unnecessary change of the luminance range due to erroneous setting or erroneous transmission of the luminance information. Thus, it is possible to prevent uncomfortableness or a poor physical condition of the viewer due to a sudden unnecessary change in the luminance.

When the number of times of iteration of the luminance range after the luminance range changes is a given number of times or more, the level control unit 179 decides the change of the luminance range, and a given number of times related to expansion of the luminance range is greater than a given number of times related to reduction of the luminance range.

According to such a configuration, it is possible to prevent a sudden unnecessary increase in the luminance that becomes a main cause of uncomfortableness or a poor physical condition of the viewer.

[Second Embodiment]

Next, a second embodiment of the invention will be described. A configuration and processing that are the same as those of the embodiment described above are given the same reference signs and description thereof is incorporated by reference.

The broadcast system 1 according to the present embodiment is configured by including the reception device 10 and the transmission device 20 as illustrated in FIG. 1. As luminance flags indicating luminance information of a video to be broadcasted, the transmission device 20 according to the present embodiment transmits, to the broadcasting transmission path BT, a current flag that indicates luminance information of the video at that time and a preannouncement flag that indicates luminance information of the video when a given time has lapsed after that time by including in service information. The reception device 10 acquires the current flag and the preannouncement flag from the service information received via the broadcasting transmission path BT. When a luminance range indicated by the current flag is different from a luminance range indicated by the preannouncement flag, the reception device 10 gradually changes setting of the luminance range from setting of the luminance range indicated by the current flag to setting of the luminance range indicated by the preannouncement flag within a given time.

With the luminance defined on the basis of the changed setting of the luminance range, the reception device 10 displays a video related to video data that is carried by a broadcast signal.

(Preannouncement Flag)

Figure 13:
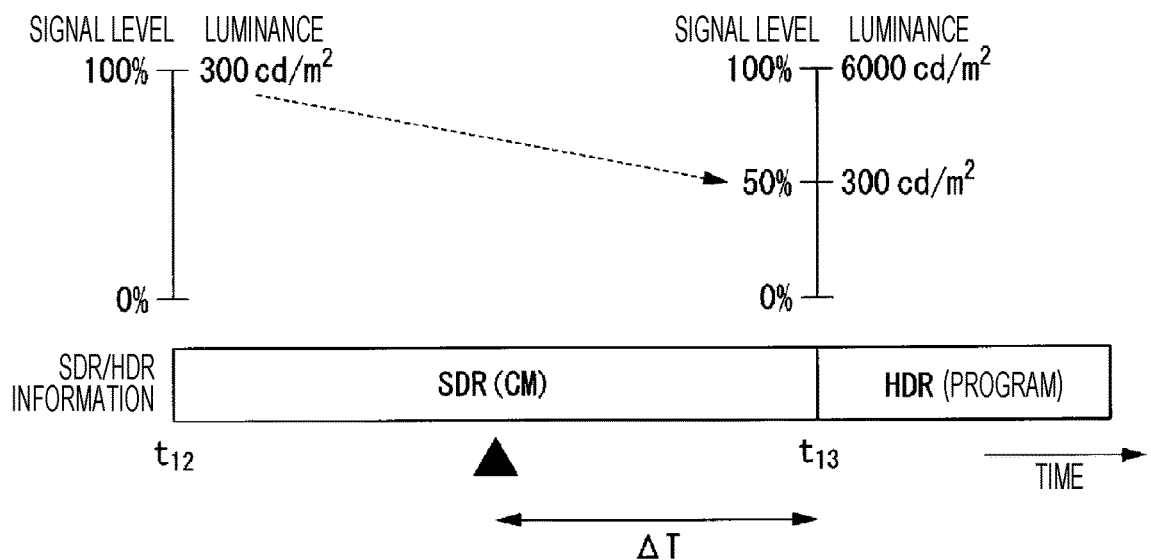
FIG. 13 is a view for explaining a preannouncement flag.

Next, a preannouncement flag will be described. The preannouncement flag is luminance information that indicates a change of the luminance range after a given time $\Delta T$ (for example, five seconds) from that time. On the other hand, a current flag corresponds to the luminance flag described above. FIG. 13 exemplifies a case where a CM constituted by an SDR video is broadcasted from a time t12 to a time t13 and a program constituted by an HDR video is broadcasted from the time t13. In the example, a preannouncement flag is provided at a time t13−$\Delta T$. The preannouncement flag is information indicating that the luminance range of the video changes from the SDR to the HDR at the time 13 after the given time ΔT from the time t13–ΔT. The level control unit 179 performs control for the luminance rage as described above by referring to the preannouncement flag and thereby reduces a sudden change in the luminance accompanying the change of the luminance range.

The preannouncement flag is transmitted being included in service information. The service information in which the preannouncement flag is included may be input from outside of the transmission device 20 to the service information acquisition unit 210 (FIG. 4) of the transmission device 20 or may be generated uniquely. The service information acquisition unit 210 acquires, from the broadcast content acquisition unit 220, broadcast program data of a broadcast program that is broadcasted at each time and specifies a time when the luminance range changes by referring to luminance information of video data included in the broadcast program data. Then, with respect to a time (the time t13–ΔT in the example illustrated in FIG. 13) the given time ΔT before the specified time (the time t13 in the example illustrated in FIG. 13), the service information acquisition unit 210 generates a preannouncement flag that indicates a change of the luminance range at the specified time. The service information acquisition unit 210 includes the generated preannouncement flag, for example, in a video component descriptor of an MPT that is transmitted at a time before the given time ΔT.

(Display of Graphic Screen)

When the preannouncement flag is input from the SI processing unit 176, the display control unit 177 (FIG. 9) may cause the display unit 15 to display a luminance change caution screen related to a change of the luminance range whose change is specified by the preannouncement flag. Here, the display control unit 177 reads out, from the storage unit 16, luminance change caution screen data related to the luminance range after the change, and outputs the luminance change caution screen data that is read out to the video processing unit 174. Thereby, the change of the luminance range from the luminance range at that time is notified to the viewer.

When an operation signal to specify display of a video setting screen is input after the preannouncement flag is input, the display control unit 177 may cause the display unit 15 to display a video setting screen related to the luminance range after the change that is indicated by the preannouncement flag. In this case, the display control unit 177 reads out, from the display unit 15, video setting screen data related to the luminance range after the change and outputs the video setting screen data that is read out to the video processing unit 174. Thereby, it is possible to prevent a setting operation in a luminance range that becomes unnecessary due to the change of the luminance range and prompt a setting operation in a new luminance range.

(Control for Luminance Range)

Figure 14:
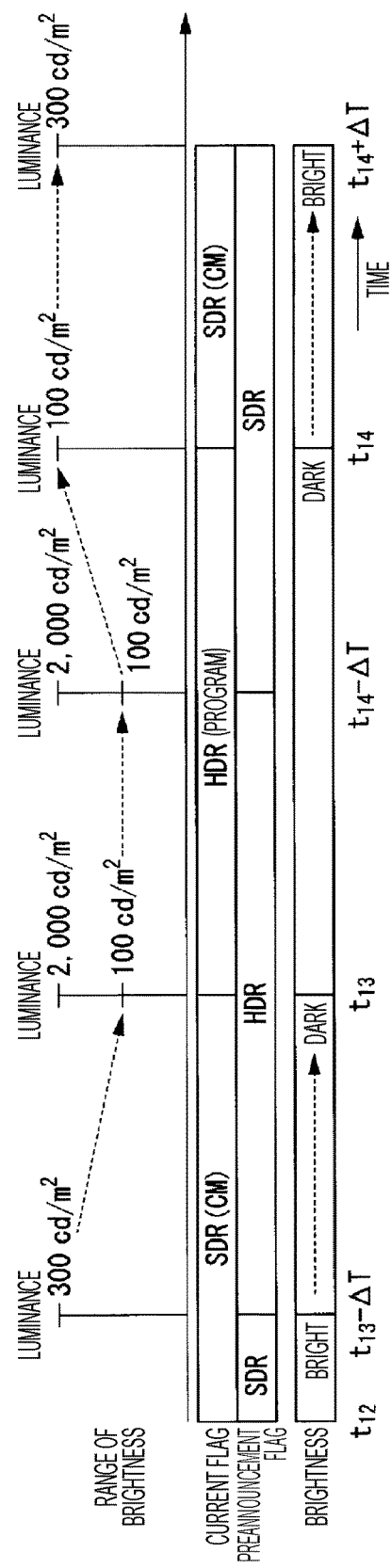
FIG. 14 illustrates an example of control for a luminance range according to a second embodiment.

Next, control for a luminance range by the level control unit 179 (FIG. 9) according to the present embodiment will be described. FIG. 14 illustrates an example of control for a luminance range according to the present embodiment. In the example illustrated in FIG. 14, with content being changed from a CM to a given program at a time $t_{13}$, a luminance range specified by SI information is expanded from the SDR to the HDR, and with the content being changed from the program to another given program at a time $t_{14}$, the luminance range specified by the SI information is reduced from the HDR to the SDR. On the other hand, a preannouncement flag that indicates a change of the luminance range from the HDR to the SDR at the time $t_{13}$ is set at a time $t_{13}$–ΔT and a preannouncement flag that indicates a change of the luminance range from the SDR to the HDR at the time $t_{14}$ is set at a time $t_{14}$–ΔT.

Then, when the preannouncement flag is input from the SI processing unit 176 at the time $t_{13}$–ΔT, the level control unit 179 starts processing for gradually reducing a maximum value of the luminance that is able to be displayed by the display unit 15 from a reference value (for example, 300 cd/m$^2$) of the SDR to a given control value (for example, 100 cd/m$^2$) over the given time ΔT. Thereby, the luminance range of an HDR video that starts at the time $t_{13}$ is 0 to 200 cd/m$^2$ and is smaller than 0 to 6000 cd/m$^2$ as the luminance range when control is not performed. As a result, the change of the luminance from the time $t_{13}$–ΔT to the time $t_{13}$ is reduced more compared to a case where control is not performed.

Meanwhile, the level control unit 179 ignores the preannouncement flag that is input from the SI processing unit 176 at the time $t_{14}$–ΔT. At the time $t_{14}$, the level control unit 179 starts processing for gradually increasing the maximum value of the luminance that is able to be displayed by the display unit 15 from a reference value (for example, 100 cd/m$^2$) of the SDR to a given control value (for example, 300 cd/m$^2$) over the given time ΔT. Thereby, the luminance range of the HDR video that is displayed till the time $t_{14}$ is 0 to 2000 cd/m$^2$. Thus, the change of the luminance from the time $t_{14}$ to $t_{14}$+ΔT is reduced compared to the case where control is not performed.

In order to control the luminance range of the video, the level control unit 179 controls an amplification factor of an amplification circuit (amplifier) that constitutes the display unit 15, for example, as setting of the luminance range. The amplification circuit is a circuit that amplifies a voltage value according to an input signal value of each of pixels and outputs the resultant to the pixel. In the example illustrated in FIG. 14, the level control unit 179 linearly reduces the amplification factor, which is set to the display unit 15, from a reference value to ⅓ of the reference value from the time $t_{13}$–ΔT to the time $t_{13}$. The level control unit 179 linearly increases the amplification factor from ⅓ of the reference value to the original reference value from the time $t_{14}$ as a time when the current flag is input to the time $t_{14}$+ΔT.

In the example illustrated in FIG. 14, however, the luminance range of the HDR video is 0 to 2000 cd/m$^2$, and is thus narrower than the luminance range of 0 to 6000 cd/m$^2$ that is originally expected. Then, when the luminance range specified by the current flag changes from the SDR to the HDR, the level control unit 179 gradually changes the setting of the luminance range in which the luminance range is reduced to the original setting of the luminance range over the given time ΔT. When a preannouncement flag indicating a change of the luminance range from the HDR to the SDR is input, the level control unit 179 gradually changes the original setting of the luminance range to the setting in which the luminance range is reduced, over the given time ΔT.

Figure 15:
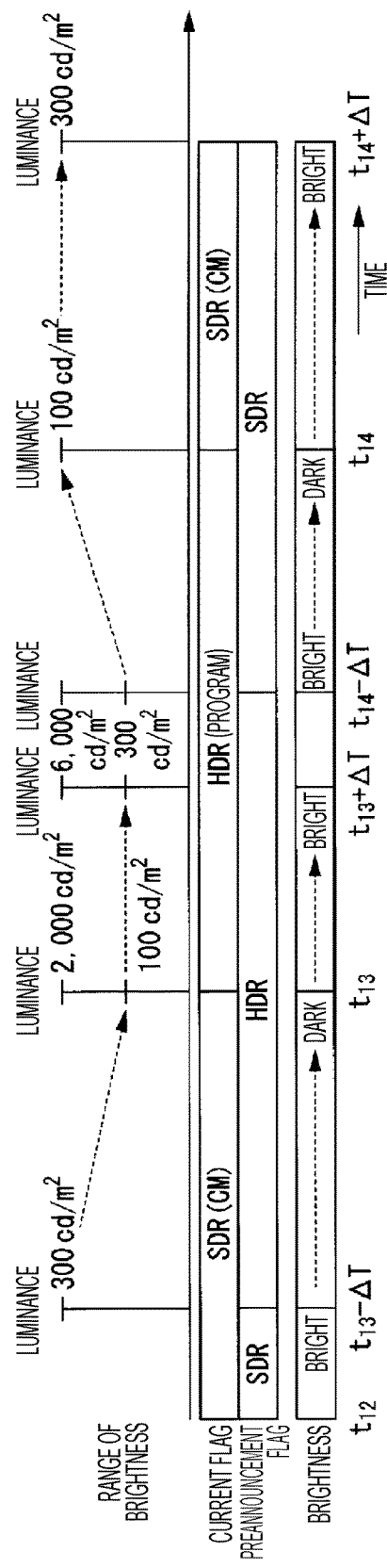
FIG. 15 illustrates an example of control for a luminance range according to the second embodiment.

In an example illustrated in FIG. 15, the level control unit 179 gradually changes the setting of the luminance range in which the luminance range is reduced to the original setting from the time $t_{13}$ when the current flag is input to a time $t_{13}$+ΔT. The level control unit 179 gradually changes the setting of the luminance range to the setting, in which the luminance range is reduced, over the given time ΔT from the time $t_{14}$–ΔT to the time $t_{14}$. Thereby, the change of the luminance range is reduced and the HDR video is displayed in the luminance range of 0 to 6000 cd/m² that is originally expected.

Note that, for a correction coefficient related to gamma correction, at a time (for example, the time $t_{13}$) related to a change of the luminance range, which is specified by the preannouncement flag, the level control unit 179 may set, to the video processing unit 174, a correction coefficient related to the luminance range after the change. At this time, the correction coefficient that is set till that time is immediately switched to a correction coefficient according to a format of video data to be decoded.

(Time Change of Luminance Range)

Figure 16:
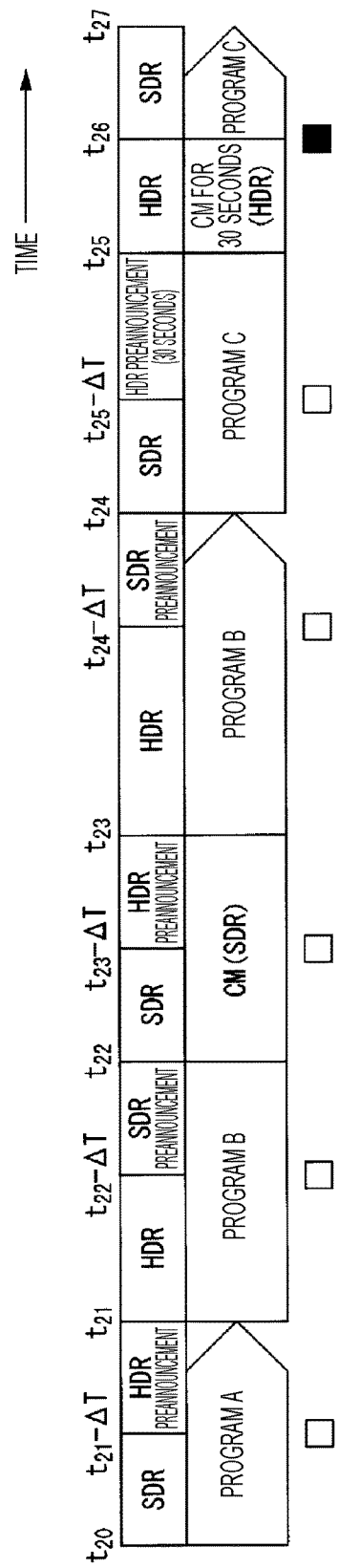
FIG. 16 illustrates an example of a time change of a luminance range of a video.

FIG. 16 illustrates an example of a time change of a luminance range of a video.

In the example illustrated in FIG. 16, a program A is broadcasted from a time $t_{20}$ to a time $t_{21}$, a program B is broadcasted from the time $t_{21}$ to a time $t_{24}$, and a program C is broadcasted from the time $t_{24}$ to a time $t_{27}$. In the program A, an SDR video is broadcasted in all sections from the time $t_{20}$ to the time $t_{21}$. In the program B, an HDR video is broadcasted in a section from the time $t_{21}$ to a time $t_{22}$ and a section from a time $t_{23}$ to the time $t_{24}$. A CM that is constituted by an SDR video is inserted in a section from the time $t_{22}$ to the time $t_{23}$. In the program C, an SDR video is broadcasted in a section from the time $t_{24}$ to a time $t_{25}$ and a section from a time $t_{26}$ to the time $t_{27}$. A CM that is constituted by an HDR video is inserted in a section from the time $t_{25}$ to the time $t_{26}$. A time between the time $t_{25}$ and the time $t_{26}$ is 30 seconds.

In FIG. 16, a mark □ assigned to a time $t_{21}-\Delta T$, a time $t_{22}-\Delta T$, a time $t_{23}-\Delta T$, and a time $t_{24}-\Delta T$ indicates a time when the reception device 10 receives a preannouncement flag. On the basis of the preannouncement flag, the level control unit 179 performs control for the luminance range as described with use of FIG. 14 or 15. Upon acquisition of the preannouncement flag at the time $t_{21}-\Delta T$, for example, the level control unit 179 gradually makes a change to setting, in which the luminance range is reduced, from the time $t_{21}-\Delta T$ to the time $t_{21}$ and gradually makes a change to setting, in which the luminance range is expanded, from the time $t_{21}$ to the time $t_{21}-\Delta T$ (refer to FIG. 15).

Upon reception of the preannouncement flag, the display control unit 177 causes the display unit 15 to display a luminance change caution screen that indicates a change to the luminance range, which is specified by the preannouncement flag. When an operation signal to specify display of a video setting screen is input to the display control unit 177, the display control unit 177 causes the display unit 15 to display the video setting screen related to the luminance range after the change that is specified by the preannouncement flag.

Note that, the preannouncement flag may further include information of a duration time and may be information indicating a change of the luminance range by a duration time that is specified. In the example illustrated in FIG. 16, the preannouncement flag received at a time $t_{25}-\Delta T$ includes information of a duration time (30 minutes) from the time $t_{25}$ to the time $t_{26}$. At the time $t_{25}-\Delta T$, the level control unit 179 starts control for the luminance range when the luminance range changes from the SDR to the HDR, and additionally, at a time $t_{26}-\Delta T$ that is a time indicated by a black square, the level control unit 179 starts control for the luminance range when the luminance range is returned from the HDR to the SDR that is the original luminance range. The time $t_{26}$ is a time after 30 seconds as the duration time from the time $t_{25}$ that is a time when broadcasting of a CM starts. Under such control, the level control unit 179 gradually makes a change to the setting, in which the luminance range is reduced, from the time $t_{26}-\Delta T$ to the time $t_{26}$ and gradually makes a change to the setting, in which the luminance range is expanded, from the time $t_{26}$ to a time $t_{26}+\Delta T$ (refer to FIG. 15). Thereby, in a case where a video (typically, for a short time period of 15 seconds, 30 seconds, or the like) whose duration time is defined in advance like a specific scene or a CM is broadcasted, it is not necessary to further set a preannouncement flag when the video ends. Setting of a preannouncement flag in editing of a program is simplified.

Next, control for a luminance range according to the present embodiment will be described.

Figure 17:
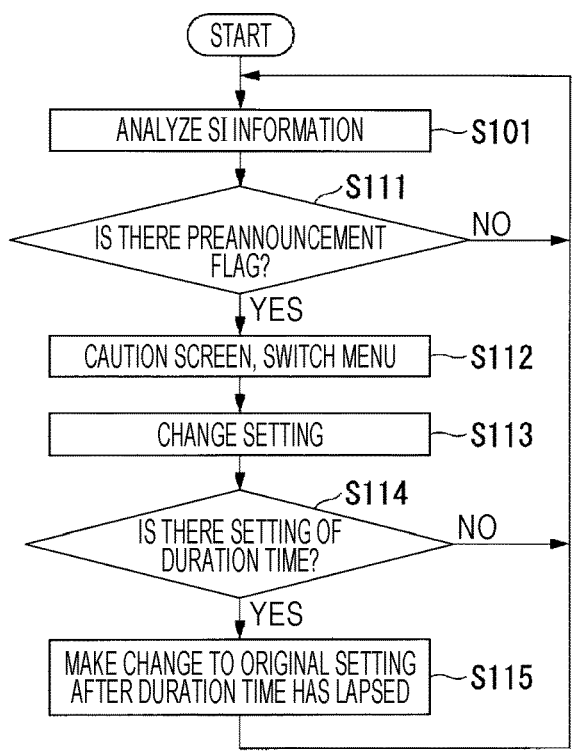
FIG. 17 is a flowchart indicating control for a luminance range according to the second embodiment.

FIG. 17 is a flowchart indicating control for a luminance range according to the present embodiment.

In processing illustrated in FIG. 17, after step S101 (FIG. 12) ends, the procedure proceeds to processing of step S111.

(Step S111) The display processing unit 175 determines whether or not a preannouncement flag is included in luminance information. When it is determined that a preannouncement flag is included (step S111, YES), the procedure proceeds to processing of step S112. When it is determined that a preannouncement flag is not included (step S111, NO), the procedure returns to processing of step S101.

(Step S112) The display control unit 177 causes the display unit 15 to display a luminance change caution screen (caution screen) related to a change to a luminance range that is specified to be changed by the preannouncement flag. When an operation signal to specify display of a video setting screen is input, the display control unit 177 causes the display unit 15 to display a video setting screen (menu switch) related to a luminance range after the change that is indicated by the preannouncement flag. Then, the procedure proceeds to step S113.

(Step S113) The level control unit 179 gradually makes a change to setting, in which the luminance range is reduced, over a given time till a time when luminance information changes. Immediately after that, the level control unit 179 may gradually make a change to setting, in which the luminance range is expanded, over the given time (FIG. 15). Then, the procedure proceeds to step S114.

(Step S114) The level control unit 179 determines whether or not information of a video duration time is included in the acquired preannouncement flag. When it is determined that the information is included (step S114, YES), the procedure proceeds to step S115. When it is determined that the information is not included (step S114, NO), the procedure returns to step S101.

(Step S115) The level control unit 179 gradually makes a change to the setting, in which the luminance range is reduced, over the given time until the duration time during which a change is specified by the preannouncement flag has lapsed after a time when luminance information changes (till a time when the luminance information changes next time). However, such processing is omitted when processing for making a change to the setting in which the luminance range is expanded is not performed at step S113. The level control unit 179 gradually makes a change to the setting (original setting), in which the luminance range is expanded, over the given time when the duration time during which a change is specified by the preannouncement flag has lapsed after the time when the luminance information changes. Then, the procedure returns to step S101.

Note that, though a case where both the time during which a change is made to the setting in which the luminance range is expanded and the time during which a change is made to the setting in which the luminance range is reduced are $\Delta T$ is exemplified in the description above, there is no limitation thereto. Both the times may be shorter than ΔT as long as being sufficient to reduce uncomfortableness or a poor physical condition of the viewer, for example, 2 to 3 seconds. The time during which a change is made to the setting in which the luminance range is reduced may be shorter than the time during which a change is made to the setting in which the luminance range is expanded.

The time during which the setting of the luminance range changes may be longer when the luminance range changes from the SDR to the HDR compared to a case where the luminance range changes from the HDR to the SDR. As described above, this is because there is a greater need to gradually change the setting as a safety design in the case of expansion of the luminance range that causes a sudden increase in the luminance or contrast, compared to the case of the reduction of the luminance range.

Though a case where a preannouncement flag is provided as preannouncement information separate from a current flag is exemplified in the description above, there is no limitation thereto. For example, in a case where a video component descriptor is described in an MH-EIT that is used as program information, the level control unit 179 and the display control unit 177 may use, as preannouncement information for a change of the luminance range, a luminance flag that is set to the video component descriptor. This is because, in the MH-EIT, for each program or segment that is a unit finer than the program, the video component descriptor is described in association with a start time and a duration time of a video that is a component of the program or the segment. For acquiring a luminance flag, the level control unit 179 and the display control unit 177 may read out the luminance flag from a luminance information table (described later) that is formed in the storage unit 16.

As described above, the reception device 10 according to the present embodiment includes the SI processing unit 176 that acquires, from service information of content, current information that indicates luminance information of a video at a current time point and preannouncement information that indicates luminance information of the video after a given time from the current time point. The reception device 10 includes the level control unit 179 that, when a luminance range indicated by the preannouncement information changes from a luminance range of the video at the current time point, changes the luminance range more gently compared to a change of the luminance range indicated by the preannouncement information. The reception device 10 includes the display unit 15 that displays the video in the luminance range defined by the level control unit 179.

According to such a configuration, it is possible to start processing for reducing a change of the luminance range before a scheduled change of the luminance range. Thus, by reducing a change of the luminance without causing delay of processing, it is possible to prevent or reduce uncomfortableness or a poor physical condition of the viewer.

When the luminance range specified by the preannouncement information is expanded from the luminance range of the video at the current time point, the level control unit 179 changes the luminance range over a longer time compared to a case where the luminance range specified by the preannouncement information is reduced.

According to such a configuration, it is possible to reduce expansion of the luminance range that becomes a main cause of uncomfortableness or a poor physical condition of the viewer and reduce a processing time to reduce the luminance range that results in uncomfortableness or a poor physical condition of the viewer. The reduction of the processing time makes it possible to view the content in a luminance range intended by a broadcasting company or a content creator as much as possible.

When the luminance range indicated by the preannouncement information is wider than the luminance range of the video at the current time point, the level control unit 179 gradually reduces maximum luminance of the video to given luminance within a given time.

According to such a configuration, it is possible to reduce a sudden increase in the luminance after the given time specified by the preannouncement information. Thus, uncomfortableness or a poor physical condition of the viewer is prevented or reduced.

After the given time has lapsed, the level control unit 179 gradually releases the reduction of the luminance to the given luminance.

According to such a configuration, it is possible to prevent or reduce uncomfortableness or a poor physical condition of the viewer, which is caused again by an increase of the luminance, and it is possible to view the content in a luminance range intended by a broadcasting company or a content creator as much as possible.

When an effective duration time is further set to the luminance information indicated by the preannouncement information, the level control unit gradually releases the luminance reduction to the given luminance, when the duration time has further lapsed after the given time.

According to such a configuration, it becomes unnecessary to further set preannouncement information, so that the setting of the preannouncement information is simplified. Thus, processing and an operation that are related to setting of service information according to editing of a program are reduced.

The reception device 10 further includes the display control unit that, when the luminance range indicated by the preannouncement information changes, notifies the change of the luminance range.

According to such a configuration, a preannouncement of the change of the luminance range is given to the viewer, so that the viewer is prompted to take an action of avoiding a sudden change in the luminance, for example, to avoid viewing.

[Third Embodiment]

Next, a third embodiment of the invention will be described. A configuration and processing that are the same as those of the embodiments described above are given the same reference signs and description thereof is incorporated by reference.

The broadcast system 1 according to the present embodiment is configured by including the reception device 10 and the transmission device 20 as illustrated in FIG. 1. The reception device 10 acquires, from service information related to a broadcast program, luminance information of a video included in the broadcast program provided by each channel By referring to the acquired luminance information, the reception device 10 determines whether or not a luminance range of a video of content received on a selected channel changes from a luminance range of content received at a current time point. When determining that there is a change, the reception device 10 gradually changes setting of the luminance range to setting of a luminance range after the change and displays the video with use of the changed setting.

The service information acquisition unit 210 (FIG. 4) of the transmission device 20 according to the present embodiment acquires service information that includes an MH-EIT in which a video component descriptor is described as program information.

A luminance flag is set to the video component descriptor as described above. In the MH-EIT, for each program or segment, the video component descriptor is described in association with a start time and a duration time of a video that is a component of the program or segment. Thus, in the MH-EIT, for each program or segment, the luminance flag is used for the association as luminance information indicating a luminance range of the video.

In the reception device 10 according to the present embodiment, the SI processing unit 176 (FIG. 9) extracts, for each channel, a set of a program or segment, a start time, a duration time, and a luminance flag from an MH-EIT that is input from the separation unit 172. The SI processing unit 176 stores, for each channel, the extracted set in the storage unit 16 in order of the start time to thereby form a luminance information table.

The broadcast reception unit 11 includes a tuner capable of receiving broadcast signals of a plurality of channels in parallel. The broadcast reception unit 11 outputs, to the demodulation unit 171, a broadcast signal corresponding to a channel specified by a channel tuning signal from the channel tuning unit 178 among the received broadcast signals.

As decoding units that decode video data, the video processing unit 174 may include an SDR decoding unit that decodes SDR video data input from the separation unit 172 and acquires decoded SDR video data and an HDR decoding unit that decodes HDR video data and acquires decoded HDR video data. With use of correction coefficients corresponding to the HDR and the SDR, the video processing unit 174 may perform gamma correction for each of the HDR video data and the SDR video that are decoded.

According to such a configuration, a broadcast signal of only one channel is able to be received, thus making it possible to eliminate interruption of a video that is caused immediately after channel switching or interruption of a video that is caused by changing a luminance range.

The level control unit 179 refers to the luminance information table stored in the storage unit 16 to determine whether or not, in the selected channel, the luminance range indicated by the luminance information changes with switching of a program or segment at that time. In the level control unit 179, there is a case where the channel specified by the channel tuning signal input from the channel tuning unit 178 changes from the channel that is selected at that time. In this case, the level control unit 179 determines whether or not the luminance range indicated by the luminance information in the channel after the change changes from the luminance range indicated by the luminance information in the channel immediately before the change.

When determining that the luminance range changes, the level control unit 179 gradually changes the setting of the luminance range from the luminance range before the change to the luminance range after the change over a given luminance transition time T. For changing the setting of the luminance range, the level control unit 179 may change a maximum value of a signal level in a continuous manner with respect to a time change, for example, as described with use of FIG. 11. The level control unit 179 outputs, to the video processing unit 174, the setting of the luminance range that is defined for each frame. By adjusting a signal level indicated by video data on the basis of the setting of the luminance range that is input from the level control unit 179 as described above, the video processing unit 174 causes the display unit 15 to display a video in the luminance range.

When the level control unit 179 determines that the luminance range changes, the display control unit 177 causes the display unit 15 to display a luminance change caution screen related to the luminance range after the change. When an operation signal to specify display of a video setting screen is input to the display control unit 177, the display control unit 177 causes the display unit 15 to display a video setting screen related to the luminance range after the change.

(Time Change of Luminance Range)

Figure 18:
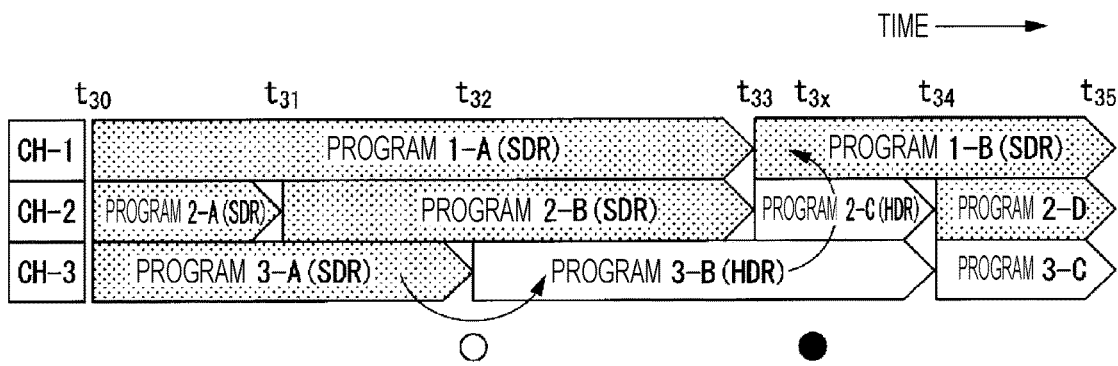
FIG. 18 illustrates an example of a time change of a luminance range of a video.

FIG. 18 illustrates an example of a time change of a luminance range of a video. In the example illustrated in FIG. 18, on a channel CH-1, a program 1-A is broadcasted from a time $t_{30}$ to a time $t_{33}$ and a program 1-B is broadcasted from the time $t_{33}$ to a time $t_{35}$. On a channel CH-2, a program 2-A is broadcasted from the time $t_{30}$ to a time $t_{31}$, a program 2-B is broadcasted from the time $t_{31}$ to the time $t_{33}$, a program 2-C is broadcasted from the time $t_{33}$ to a time $t_{34}$, and a program 2-D is broadcasted from the time $t_{34}$ to the time $t_{35}$. On a channel CH-3, a program 3-A is broadcasted from the time $t_{30}$ to a time $t_{32}$, a program 3-B is broadcasted from the time $t_{32}$ to the time $t_{34}$, and a program 3-C is broadcasted from the time $t_{34}$ to the time $t_{35}$. Among the programs, in the programs 1-A, 1-B, 2-A, 2-B, 2-D, and 3-A, an SDR video is broadcasted. In the programs 2-C, 3-B, and 3-C, an HDR video is broadcasted.

Here, a case where the channel CH-3 is selected from the time $t_{30}$ to a time $t_{3x}$ and the channel CH-1 is selected from the time $t_{3x}$ to the time $t_{35}$ is taken as an example.

According to luminance information about the channel CH-3 obtained by referring to a luminance information table, the luminance range of the video is expanded from the SDR to the HDR at the time $t_{32}$ indicated by a mark ○. At this time, the level control unit 179 determines that the luminance range changes from the SDR to the HDR. The level control unit 179 gradually changes the setting of the luminance range from setting of the SDR to setting of HDR over a given luminance transition time τ. The display control unit 177 causes the display unit 15 to display a luminance change caution screen indicating that the luminance range changes to the HDR. In a case where an operation signal to specify display of a video setting screen is input, the display control unit 177 causes the display unit 15 to display a video setting screen indicating that the luminance range is the HDR.

At the time $t_{3x}$ indicated by a mark ●, a channel tuning signal to specify switching from the channel CH-3 to the channel CH-1 is input to the level control unit 179. According to luminance information about the channel CH-1 obtained by referring to the luminance information table, the luminance range of the video is reduced from the HDR to the SDR. At this time, the level control unit 179 determines that the luminance range changes from the HDR to the SDR. The level control unit 179 gradually changes the setting of the luminance range from the setting of the HDR to the setting of the SDR over the given luminance transition time τ. The display control unit 177 causes the display unit 15 to display a luminance change caution screen indicating that the luminance range changes to the SDR. In a case where an operation signal to specify display of a video setting screen is input, the display control unit 177 causes the display unit 15 to display a video setting screen indicating that the luminance range is the SDR.

Next, control for a luminance range according to the present embodiment will be described.

Figure 19:
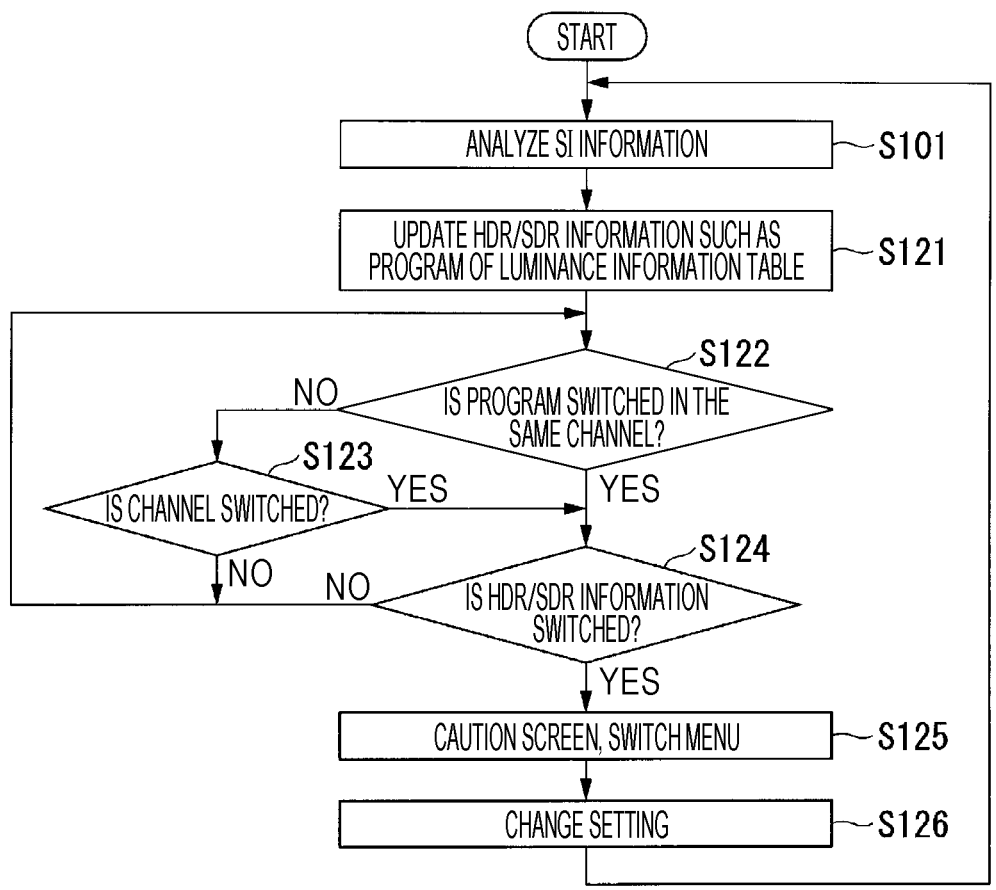
FIG. 19 is a flowchart indicating control for a luminance range according to a third embodiment.

FIG. 19 is a flowchart indicating control for a luminance range according to the present embodiment.

In processing illustrated in FIG. 19, after step S101 (FIG. 13) ends, the procedure proceeds to processing of step S121.

(Step S121) The SI processing unit 176 extracts a set of a program or segment, a start time, a duration time, and a luminance flag (HDR/SDR information), which is extracted for each channel from an MH-EIT that is input from the separation unit 172. The SI processing unit 176 stores, for each channel, the extracted set in order of the start time to thereby update a luminance information table. Then, the procedure proceeds to processing of step S121.

(Step S122) The level control unit 179 refers to the luminance information table stored in the storage unit 16 and determines whether or not the program or segment is switched in the same channel with lapse of time. When it is determined that the switching is performed (step S122, YES), the procedure proceeds to step S124. When it is determined that the switching is not performed (step S122, NO), the procedure proceeds to step S123.

(Step S123) The level control unit 179 determines whether or not a channel indicated by a channel tuning signal input from the channel tuning unit 178 is switched from the channel that is selected up to that time. When it is determined that the switching is performed (step S123, YES), the procedure proceeds to step S124. When it is determined that the switching is not performed (step S123, NO), the procedure returns to step S122.

(Step S124) The level control unit 179 determines whether or not luminance information of a video broadcasted on a channel after the change is switched from the luminance information of the video broadcasted on the channel before the change. When it is determined that the switching is performed (step S124, YES), the procedure proceeds to step S125. When it is determined that the switching is not performed (step S124, NO), the procedure returns to step S122.

(Step S125) The display control unit 177 causes the display unit 15 to display a luminance change caution screen (caution screen) related to the change to the luminance range for which it is determined that the switching is performed. When an operation signal to specify display of a video setting screen is input, the display control unit 177 causes the display unit 15 to display a video setting screen (menu switching) related to the luminance range for which it is determined that the switching is performed. Then, the procedure proceeds to step S126.

(Step S126) The level control unit 179 gradually changes the setting of the luminance range of the video from setting related to the luminance range before the change to setting of the luminance range after the change over a given luminance transition time τ. Then, the procedure returns to processing of step S101.

Note that, in the present embodiment, instead of referring to the luminance information table stored in the storage unit 16 and determining switching of the program or segment at that time, the level control unit 179 may determine switching of the program or segment when a given time ΔT has lapsed after that time. When determining that the luminance range changes, the level control unit 179 gradually changes the setting of the luminance range from the setting of the luminance range of the video up to that time to setting of the luminance range of the video after the given time ΔT. For changing the luminance range, the level control unit 179 may change a gain of the display unit 15 as the setting of the luminance range in a continuous manner with respect to a time change, for example, as described with use of FIG. 14 or 15. The display control unit 15 adjusts a signal level of the gain set by the level control unit 179 and displays the video with the adjusted signal level.

As described above, the reception device 10 includes the SI processing unit 176 that acquires, from service information of content transmitted by a broadcast signal, luminance information of a video provided by each channel. The reception device 10 includes the level control unit 179 that determines, on the basis of the luminance information, whether or not a luminance range of a video provided on a channel that is selected changes from a luminance range of a video at a current time point, and when determining that the luminance range changes, changes the setting of a luminance range to setting of the luminance range after the change over a given time. The reception device 10 includes the display unit 15 that displays the video on the basis of the setting of the luminance range that is defined by the level control unit 179.

According to such a configuration, it is possible to determine whether or not a luminance range changes upon a change of a channel on the basis of luminance information of a video that is acquired in advance. Thus, it is possible to eliminate or reduce delay of processing related to the change of the luminance range associated with the change of the channel and prevent or reduce uncomfortableness or a poor physical condition of the viewer.

The reception device 10 further includes the broadcast reception unit 11 that receives broadcast signals of a plurality of channels and selects a broadcast signal of the channel that is selected from among the broadcast signals of the plurality of channels.

According to such a configuration, it is possible to avoid interruption and restart of a video that is caused by channel switching and continue display of the video in which a change of a luminance range is reduced. Thus, it is possible to prevent or reduce uncomfortableness or a poor physical condition of the viewer due to a sudden change in the luminance that accompanies the interruption and restart of the video.

The reception device 10 further includes the display control unit 177 that notifies, when the luminance range changes, the change of the luminance range.

According to such a configuration, a preannouncement of the change of the luminance range that accompanies channel switching is given to the viewer, so that the viewer is prompted to take an action of avoiding a sudden change in the luminance, for example, to avoid viewing.

As above, the embodiments of the invention have been described in detail with reference to the drawings, but the specific configuration is not limited to the aforementioned embodiments and includes, for example, a design that falls within the gist of the invention. Any of the configurations described in the aforementioned embodiments may be combined.

For example, the reception device 10 may execute the processing illustrated in FIG. 12 or the processing illustrated in FIG. 17, and steps S121 and S123 to S126 of FIG. 19. In the processing illustrated in FIG. 17, the reception device 10 may use, as a preannouncement flag, luminance information that is stored in the luminance information table in association with a broadcast start time.

In the control for the luminance range performed at step S105 of FIG. 12 or step S126 of FIG. 19, instead of controlling a maximum value of a signal level that is set to the video processing unit 174 as setting of the luminance range, the level control unit 179 may control a gain of the display unit 15. In the example illustrated in FIG. 11, the level control unit 179 reduces the gain of the display unit 15 from a given reference value to ½₀ (=300/6000) of the reference value at the time $t_3$, and then linearly changes the gain of the display unit 15 to the reference value up to the time $t_3+\tau$. In this case, the video processing unit 174 uses a given maximum value of the luminance range specified by luminance information and clipping based on the maximum value from the level control unit 179 is able to be omitted.

In the control for the luminance range performed at steps S113 and 115 of FIG. 17, instead of controlling the gain of the display unit 15 as setting of the luminance range, a maximum value of a signal level that is set to the video processing unit 174 may be controlled. In the example illustrated in FIG. 15, the level control unit 179 changes the maximum value of the signal level at the time $t_{13}$ from a given maximum value of the SDR to ½ (corresponding to the signal level of 50%, 300 cd/m²) of a given maximum value of the HDR. At this time point, maximum luminance does not change with the switching from the SDR to the HDR. Then, the level control unit 179 linearly changes the maximum value of the signal level to the given maximum value of the HDR up to the time $t_{13}+\Delta T$. The level control unit 179 linearly changes the maximum value of the signal level from the given maximum value of the HDR to ½ thereof from the time $t_{14}-\Delta T$ to the time $t_{14}$. Then, at the time $t_{14}$, the level control unit 179 changes the maximum value of the signal level to the given maximum value of the SDR. Though the video processing unit 174 performs clipping of the signal value on the basis of the maximum value defined by the level control unit 179, the luminance of an entire video does not change and there exist signal levels having common luminance before and after the luminance range changes. This makes it possible to reduce or eliminate deterioration of image quality.

Note that, various numerical values in the aforementioned embodiments are merely examples and the values are not limited. For example, the numerical values such as 50% and 100% as the signal levels and 300 cd/m² and 6000 cd/m² as the luminance that are illustrated in FIG. 2 may be other numerical values (for example, 70% and 100% as the signal levels and 800 cd/m² and 6000 cd/m² as the luminance). For example, the numerical values such as 100 cd/m² and 2000 cd/m² as the luminance that are illustrated in FIG. 14 may be other numerical values (for example, 75 cd/m² and 1500 cd/m² as the luminance).

Note that, though description has been given in the aforementioned embodiments for an example in which the broadcast system 1 uses the MMT system as the media transport system, there is no limitation thereto. The broadcast system 1 may use a media transport system, for example, such as an MPEG-2 TS system or an RTP (Real-time Transport Protocol) system.

Note that, the invention described above may be carried out in the following aspects.

(1) A reception device including: a service information processing unit that acquires, from service information of content, current information that indicates luminance information of a video at a current time point and preannouncement information that indicates luminance information of the video after a given time from the current time point; a level control unit that, when a luminance range indicated by the preannouncement information changes from a luminance range of the video at the current time point, changes a luminance range more gently compared to a change of the luminance range; and a display unit that displays the video in the luminance range defined by the level control unit.

(2) The reception device according to (1), in which when the luminance range specified by the preannouncement information is expanded from the luminance range of the video at the current time point, the level control unit changes the luminance range over a longer time compared to a case where the luminance range indicated by the preannouncement information is reduced.

(3) The reception device according to (1) or (2), in which when the luminance range indicated by the preannouncement information is wider than the luminance range of the video at the current time point, the level control unit gradually reduces maximum luminance of the video to given luminance within the given time.

(4) The reception device according to (3), in which the level control unit gradually releases luminance reduction to the given luminance after the given time has lapsed.

(5) The reception device according to (3) or (4), in which in a case where an effective duration time is further set to the luminance information indicated by the preannouncement information, the level control unit gradually releases luminance reduction to the given luminance when the duration time has further lapsed after the given time.

(6) The reception device according to any one of (1) to (5), further including a display control unit that, when the luminance range indicated by the preannouncement information changes, notifies a change of the luminance range.

(7) A broadcast system including a transmission device and a reception device, in which the transmission device transmits content, and service information of the content that includes current information that indicates luminance information of a video at a current time point and preannouncement information that indicates luminance information of the video after a given time from the current time point, and the reception device includes: a service information processing unit that acquires the current information and the preannouncement information from the service information; a level control unit that, when a luminance range indicated by the preannouncement information changes from a luminance range of the video at the current time point, changes a luminance range more gently compared to a change of the luminance range; and a display unit that displays the video in the luminance range defined by the level control unit.

(8) A reception method in a reception device, the reception method including the steps of: acquiring, from service information of content, current information that indicates luminance information of a video at a current time point and preannouncement information that indicates luminance information of the video after a given time from the current time point; and when a luminance range indicated by the preannouncement information changes from a luminance range of the video at the current time point, changing a luminance range, in which the video is displayed, more gently compared to a change of the luminance range.

(9) A program causing a computer of a reception device to execute the steps of: acquiring, from service information of content, current information that indicates luminance information of a video at a current time point and preannouncement information that indicates luminance information of the video after a given time from the current time point; and when a luminance range indicated by the preannouncement information changes from a luminance range of the video at the current time point, changing a luminance range, in which the video is displayed, more gently compared to a change of the luminance range.

The reception device 10 and the transmission device 20 described above may be realized by recording a program for realizing functions of the reception device 10 and the transmission device 20 on a computer-readable recording medium and causing a computer system to read the program recorded on the recording medium for execution. Here, "causing a computer system to read the program recorded on the recording medium for execution" encompasses installing the program in the computer system. The "computer system" here is defined to include an OS and hardware components such as a peripheral device. Further, the "computer system" may include a plurality of computer devices connected via a network including a communication line such as the Internet, WAN, LAN, a dedicated line, or the like.

The "computer-readable recording medium" refers to a portable medium such as a flexible disk, a magneto-optical disk, a ROM, and a CD-ROM, and a storage device such as a hard disk built into the computer system. Thus, the recording medium storing the program may be a non-transitory recording medium such as a CD-ROM. The recording medium also includes internal and external recording media capable of being accessed from a distribution server that distributes the aforementioned program. A code of the program stored in the recording medium of the distribution server may be different from a code of a program written in a format executable by a terminal device. That is, any format can be used to store the program in the distribution server as long as the program is able to be downloaded from the distribution server and installed in the terminal device in an executable format.

Note that, the program may be configured to be divided into plural pieces and integrated in the terminal device after being downloaded at different timings from each other, and the divided programs may be distributed from different distribution servers from each other. Furthermore, the "computer-readable recording medium" includes a medium that retains the program for a certain time period, such as a volatile memory (RAM) within a server or the computer system serving as a client in a case where the program is transmitted through a network. In addition, the aforementioned program may be configured to realize a part of the functions described above. The aforementioned program may also be a program capable of realizing the functions described above in combination with a program already recorded in the computer system, that is, a so-called difference file (difference program).

INDUSTRIAL APPLICABILITY

As described above, the reception device, the broadcast system, the reception method, and the program according to the invention are useful for controlling luminance of a video that is broadcasted.

REFERENCE SIGNS LIST 1 broadcast system
10 reception device
11 broadcast reception unit
12 input unit
14 amplification unit
15 display unit
16 storage unit
17 control unit
171 demodulation unit
172 separation unit
173 sound processing unit
174 video processing unit
175 display processing unit
176 SI processing unit
177 display control unit
178 channel tuning unit
179 level control unit
20 transmission device
210 service information acquisition unit
220 broadcast content acquisition unit
230 multiplexing unit
240 modulation unit
250 transmission unit
BT broadcasting transmission path
BS broadcast satellite
RC control device

The invention claimed is:

1. A reception device comprising:
a service information processing unit that acquires, from service information of content, current information that indicates luminance information of a video at a current time point and preannouncement information that indicates luminance information of the video after a given time from the current time point;
a level control unit that, in a case that a preannouncement luminance range indicated by the preannouncement information changes from a current luminance range of the video at the current time point, changes the current luminance range over a given luminance transition time; and
a display unit that displays the video in the current luminance range defined by the level control unit, wherein
the level control unit:
determines whether the preannouncement luminance range is expanded or reduced from the current luminance range,
changes, over a first time, the current luminance range to the preannouncement luminance range in a case that the preannouncement luminance range is expanded from the current luminance range, and
changes, over a second time shorter than the first time, the current luminance range to the preannouncement luminance range in a case that the preannouncement luminance range is reduced from the current luminance range.

2. The reception device according to claim 1, wherein in a case that the preannouncement luminance range is wider than the current luminance range, the level control unit reduces maximum luminance of the video to given luminance within the given time.

3. The reception device according to claim 2, wherein the level control unit releases luminance reduction to the given luminance after the given time has lapsed.

4. The reception device according to claim 2, wherein in a case where an effective duration time is further set to the luminance information indicated by the preannouncement information, the level control unit releases luminance reduction to the given luminance in a case that the duration time has further lapsed after the given time.

5. The reception device according to claim 1, further comprising
a display control unit that, in a case that the preannouncement luminance range changes, notifies a change of the preannouncement luminance range.

6. A broadcast system including a transmission device and a reception device, wherein
the transmission device transmits content and service information of the content that includes current information that indicates luminance information of a video at a current time point and preannouncement information that indicates luminance information of the video after a given time from the current time point, and the reception device includes:
- a service information processing unit that acquires the current information and the preannouncement information from the service information;
- a level control unit that, in a case that a preannouncement luminance range indicated by the preannouncement information changes from a current luminance range of the video at the current time point, changes the current luminance range over a given luminance transition time; and
- a display unit that displays the video in the current luminance range defined by the level control unit;

the level control unit:
- determines whether the preannouncement luminance range is expanded or reduced from the current luminance range,
- changes, over a first time, the current luminance range to the preannouncement luminance range in a case that the preannouncement luminance range is expanded from the current luminance range, and
- changes, over a second time shorter than the first time, the current luminance range to the preannouncement luminance range in a case that the preannouncement luminance range is reduced from the current luminance range.

7. A reception method in a reception device, the reception method comprising:
- acquiring, from service information of content, current information that indicates luminance information of a video at a current time point and preannouncement information that indicates luminance information of the video after a given time from the current time point;
- in a case that a preannouncement luminance range indicated by the preannouncement information changes from a current luminance range of the video at the current time point, changing the current luminance range, in which the video is displayed, over a given luminance transition time; and
- determining whether the preannouncement luminance range is expanded or reduced from the current luminance range, wherein
- the current luminance range to the preannouncement luminance range is changed over a first time in a case that the preannouncement luminance range is expanded from the current luminance range, and
- the current luminance range to the preannouncement luminance range is changed over a second time shorter than the first time in a case that the preannouncement luminance range is reduced from the current luminance range.

8. A non-transitory computer readable recording medium storing a program causing a computer of a reception device to execute:
- acquiring, from service information of content, current information that indicates luminance information of a video at a current time point and preannouncement information that indicates luminance information of the video after a given time from the current time point;
- in a case that a preannouncement luminance range indicated by the preannouncement information changes from a current luminance range of the video at the current time point, changing the current luminance range, in which the video is displayed, over a given luminance transition time; and
- determining whether the preannouncement luminance range is expanded or reduced from the current luminance range, wherein
- the current luminance range to the preannouncement luminance range is changed over a first time in a case that the preannouncement luminance range is expanded from the current luminance range, and
- the current luminance range to the preannouncement luminance range is changed over a second time shorter than the first time in a case that the preannouncement luminance range is reduced from the current luminance range.

9. The reception device according to claim 1, wherein the given time is 2 to 3 seconds.

* * * * *